US007050753B2

(12) United States Patent
Knutson

(10) Patent No.: US 7,050,753 B2
(45) Date of Patent: May 23, 2006

(54) SYSTEM AND METHOD FOR PROVIDING LEARNING MATERIAL

(76) Inventor: Roger C. Knutson, 6444 Dover Rd., Indianapolis, IN (US) 46220

( * ) Notice: Subject to any disclaimer, the term of this patent is extended or adjusted under 35 U.S.C. 154(b) by 106 days.

(21) Appl. No.: 10/662,033

(22) Filed: Sep. 12, 2003

(65) Prior Publication Data

US 2004/0161734 A1    Aug. 19, 2004

Related U.S. Application Data

(63) Continuation of application No. 09/970,291, filed on Oct. 3, 2001, now abandoned, which is a continuation of application No. 09/557,109, filed on Apr. 24, 2000, now abandoned.

(51) Int. Cl.
*G09B 7/00* (2006.01)
(52) U.S. Cl. .............................. 434/350; 434/322
(58) Field of Classification Search .............. 434/118, 434/362, 322, 335, 350, 353, 354, 323
See application file for complete search history.

(56) References Cited

U.S. PATENT DOCUMENTS

| | | | |
|---|---|---|---|
| 5,564,043 A | 10/1996 | Siefert | |
| 5,778,380 A | 7/1998 | Siefert | |
| 5,810,605 A * | 9/1998 | Siefert | ............... 434/362 |
| 5,813,863 A | 9/1998 | Sloane et al. | |
| 5,904,485 A | 5/1999 | Siefert | |
| 5,944,530 A | 8/1999 | Ho | |
| 5,947,747 A | 9/1999 | Walker | |
| 5,957,699 A | 9/1999 | Peterson | |
| 6,064,978 A | 5/2000 | Gardner | |
| 6,065,076 A | 5/2000 | Sorenson | |
| 6,074,216 A | 6/2000 | Cueto | |
| 6,075,968 A | 6/2000 | Morris | |
| 6,077,085 A | 6/2000 | Parry | |
| 6,086,377 A | 7/2000 | Pinder | |
| 6,112,049 A * | 8/2000 | Sonnenfeld | ............... 434/350 |
| 6,116,652 A | 9/2000 | Page | |
| 6,149,441 A | 11/2000 | Pellegrino et al. | |
| 6,190,178 B1 | 2/2001 | Oh | |
| 6,260,041 B1 * | 7/2001 | Gonzalez et al. | ............ 707/10 |
| 6,514,085 B1 * | 2/2003 | Slattery et al. | ............ 434/335 |
| 6,551,107 B1 * | 4/2003 | Buckley et al. | ............ 434/262 |
| 6,684,053 B1 * | 1/2004 | Helmick et al. | ............ 434/362 |
| 6,692,256 B1 * | 2/2004 | Chan et al. | ............... 434/118 |

(Continued)

*Primary Examiner*—Kurt Fernstrom
(74) *Attorney, Agent, or Firm*—Bruce J. Bowman

(57) ABSTRACT

A system and method provides content or material such as educational, informational, or learning content from existing and/or third party content on a network such as the Internet and disseminates the content via the network to a user by correlating the culled content to a user's learning profile. The system preferably pushes the content to the user after correlation of content to the user's learning profile. The user's learning profile includes data regarding a user's learning proclivities and/or preferences of a user's learning profile. The system scans and/or searches the Internet for the existing content. The system stores data about the scanned content particularly with respect to the content itself and relative to the classifications, categories, and/or categorization of learning proclivities and/or preferences. Particularly, the system stores data regarding the elements and/or characteristics of the content with respect to the learning proclivities and/or preferences. Subject matter content is then provided as per a curriculum and/or learning chain. The learning profile also maintains data regarding learning chain progression with regard to a curriculum. Preferably, but not necessarily, the content data and learning profile are in the form of an object model and, particularly, as metadata.

21 Claims, 19 Drawing Sheets

U.S. PATENT DOCUMENTS

| | | | |
|---|---|---|---|
| 6,773,266 B1 * | 8/2004 | Dornbush et al. | 434/322 |
| 6,827,578 B1 * | 12/2004 | Krebs et al. | 434/118 |
| 6,865,370 B1 * | 3/2005 | Ho et al. | 434/362 |
| 6,871,043 B1 * | 3/2005 | Sanda | 434/307 R |
| 6,882,825 B1 * | 4/2005 | Hopkins et al. | 434/350 |
| 6,884,074 B1 * | 4/2005 | Theilmann | 434/118 |

* cited by examiner

SYSTEM AND METHOD FOR PROVIDING LEARNING MATERIAL

The present U.S. patent application is a continuation of and claims the benefit of and/or priority to U.S. patent application Ser. No. 09/970,291 filed Oct. 3, 2001 entitled System and Method For Providing Learning Material, now abandoned, which was a continuation of and claimed the benefit of and/or priority to U.S. patent application Ser. No. 09/557,109 filed Apr. 24, 2000 entitled Education System and Implementation, now abandoned.

COMPUTER PROGRAM LISTING ON CD

A computer program listing appendix of an object oriented database of metadata implementing the present invention is submitted herewith on compact disc (CD-R), including a copy thereof, a file named MINDSHARE WORKITEM OBJECT MODEL 9-12-2002.VSD, which was created on Sep. 12, 2003 being 1.034 megabytes, is included, the content of which is hereby incorporated by reference herein, each in their entirety.

BACKGROUND OF THE INVENTION

1. Field of the Invention

The present invention relates to electronic education systems and methods and, more particularly, to a computer network-enabled education system and method.

2. Description of the Related Art

Various methods of teaching have been proposed and/or implemented over the years. Beginning in the early 1960's an educator, Fred Glancy, Jr. took many of the components in education that were successful, along with research from around the world, and assembled a new program for public education. The program was given local, state and international awards and was named the Glancy Educational Method (GEM). Some of the developments in GEM that started this movement included recognition of varied learning styles, learning disabilities, computerized Individual Learning Plans (ILP), computerized Individualized Educational Plans (IEP), mainstreaming of all special education students into a traditional school system, and the application of a computerized learning template with educational methods to teach according to the learning template.

The philosophy behind GEM is that every human being is comprised of a unique blend of learning/developmental abilities and limitations. Each person learns, develops and grows differently as each person is a composite of learning abilities drawn from the basic motor, visual, language concepts and auditory characteristics and experiences of their world. A person's learning pattern is made up of a physical, emotional, environmental, sensory, genetic, spiritual and developmental set of interrelated attributes. Each person or student thus has his or her own unique attributes based on the various experiences and characteristics noted above that essentially defines the individual and his or her learning characteristics.

When a student's learning characteristics are understood, a style or manner of instruction that best fits the student's mechanism of learning can be ascertained and applied in any environment. When we know and teach each person as an individual in accordance with the person's learning characteristics, we then begin to shape more efficiently the operations of teaching and administration. The GEM thesis for all education applies this concept to adapt a separate teaching style that reaches each person individually in accordance with that person's learning characteristics. When we can accomplish that goal, it follows that true learning takes place. Some proven advantages to this approach include teacher fulfillment, parent satisfaction, and administrative efficiency.

Under GEM, individualizing the learning process yields a continuing positive educational experience for the student and the teacher. This can occur without special teacher training, without slighting the needs or expectations of any child in the classroom, and without long, extra hours of preparation. The highlights of GEM include: a) teaching each student as an individual and a whole human being; b) labeling no child as retarded, deaf, blind, etc., as each person would be taught through the way they learn; c) screening and individualizing instruction for all students in or out of the regular classroom; d) providing precise information, materials, and systematic recording procedures; e) backing up each teacher with information and resource support necessary for individualizing instruction without significant additional teacher training; and f) doing all of these without demanding excessive preparation time out of the classroom.

The above GEM goals and attributes were met and implemented with technology existing at the time of development, namely hand-written or oral teacher to student teaching and evaluating/testing with the aid of books, manuals, and other paper-based materials. Since GEM was developed in the 1960's albeit refined in the 1970's, it does not take advantage of present computer technology both as to its enhancement and implementation. With the advances of technology and voluminous addition of information constantly streaming into our lives, and the need for students to understand, assimilate, and/or learn the vast amount of material, there is a need for an update of GEM in accordance with present technology. Particularly, there is a need to provide learning material utilizing computers.

While not the total implementation of GEM, a learning management system for use by microcomputers was marketed in 1987 by Insight Unlimited, Inc. of West Lafayette, Ind. The Insight Learning Management System (ILMS) was menu-driven or command-driven software that tested a student's learning abilities and created a user profile based thereon to present information from a static database of activities/lessons, tests and remediations each of which was in a pre-determined and unchangeable format for presentation. A student's progress could be tracked by generated customizable reports. Individualized education and learning plans were formulated by the software. The database/software also has import and export capabilities.

A learning system that also utilizes computers is U.S. Pat. No. 5,813,863 issued to Sloane, et. al on Sep. 29, 1998 entitled "Interactive Behavior Modification System," wherein there is described a Multimedia Behavior Modification System (MBMS) that utilizes computers for presenting or teaching the material. The MBMS includes courseware for a particular topic and delivers the courseware over a local area network (LAN), wide area network (WAN), or the internet. The coursework includes a selectable progression of modules including dynamic introductory modules leading to a combination of education modules. User selectable links to primary learning modules is provided in a menu. A tracking module tracks user decisions and other characteristics and alters the program content accordingly.

Another computer learning system is described in U.S. Pat. Nos. 5,810,605 and 5,904,485 issued to Siefert on Sep. 22, 1998 entitled "Computerized Repositories Applied to Education," and on May 18, 1999 entitled "Automated Lesson Selection and Examination in Computer-Assisted Education" respectively. These related patents disclose a system for computer assisted education in which a school curriculum is stored in computer repositories. A learning profile is maintained for every student which indicates the capabilities, preferred learning style, and progress of the student. Based on the profile, the program selects proper lessons, administers examinations, updates the profile, and links the student with a subject matter expert when necessary. The system also establishes a video conference between the student and faculty member or other individual when necessary.

In U.S. Pat. No. 6,112,049 issued to Sonnenfeld on Aug. 29, 2000 and entitled "Computer Network Based Testing System" there is disclosed an automated testing system that allows for a hierarchical testing scheme. Independent building blocks (i.e. logical units) contain parameters that determine its functionality and implementation. Each building block also contains information about how it relates to the other building blocks. Each logical unit or section has a set of parameters that define, for example, an interrelation of that section with other sections, grading instructions, adaptive aspects, allowable timing, sequencing and repetition, security and randomization. The tests are provided over the Internet utilizing HTML as a web page format. This allows the system to be provided over the Internet using standard web browsers. Sonnenfeld further teaches that since the system preferably resides on the Internet, the system allows the test designer and test taker to give questions based on the content of another web site.

The above-referenced systems utilize computers that may be networked to meet learning/educational needs of a user. The two above-identified Siefert patents disclose the use of learning profiles to select computer stored, static lessons for a student based on the student's profile. Both types of systems, however, are deficient in flexibility and/or dynamic use of current technology. Moreover, while Sonnenfeld teaches the use of the Internet to provide a test to a user and, particularly, is able to test a user about the content of a particular Internet page, Sonnenfeld does not provide content from the Internet that is correlated to the learning proclivities of a user and/or with respect to a particular topic and/or location in a learning chain.

What is therefore needed in view of the above, in addition to other non-mentioned particulars, is a system and/or method that provides correlated educational material to a user that is obtained from existing content gathered from the Internet in a manner to accommodate the learning preferences and/or proclivities of the user.

SUMMARY OF THE INVENTION

The subject invention, in one form, is an Internet-based education, information, and/or learning system and method that coordinates or matches Internet content with an individual's learning proclivities and/or preferences compiled into a learning profile for presentation of the Internet content to the user as learning material. The learning material is thus presented in a manner correlating or corresponding to the user's learning profile. Internet content, encompassing educational, informational and other learning content, provides the learning material for many subjects or topics. Subjects or topics may be part of a curriculum, course of study, or with regard to a particular subject. The subject matter or learning material is also presented with regard to a learning chain of knowledge with regard to the particular subject, subject area or topic.

In one form, the Internet is searched for content, typically regarding a particular subject as learning material for the particular subject. The content comprises various elements of web pages or other similar Internet or Network content sources. The subject matter and the characteristics of each element of the content as presented, is tagged, labeled or correlated to metadata in an object model. The material is correlated to a learning profile according to the characteristics of the elements.

The system searches the Internet such as via a spider and/or bot, usually with regard to a particular subject, subject area and/or topic, and catalogues and/or categorizes the content and/or the content attributes of particular web pages for possible presentation as learning material, depending on whether the categorized/catalogued content and/or content attributes correlate to the learning profile. Data regarding the content and/or content attributes and/or the cataloging and/or categorizing of the Internet content (the page data) is compiled and stored. Preferably, but not necessarily, the page data is generated, compiled and/or stored as metadata.

Particularly, the content and/or content attributes of the located web pages are compiled into an object corresponding and/or correlated to the various learning proclivities and/or particular learning preferences that may make up a user's learning profile. Such cataloguing and/or categorizing is stored in a database.

The user's profile is stored as metadata regarding the user's proclivities and/or preferences, preferably, but not necessarily, in accordance with GEM principles. The user's profile includes, but is not limited to, a proclivities and/or preferences of learning of a user.

A central system in communication with the Internet provides a platform that searches for learning content from existing content on the Internet, filters the gathered content appropriately, classifies the filtered educational content, and provides the filtered content to the user. The central system utilizes object-oriented technology. Particularly, the central system consists of an object model. The various portions of the object model provide parameters for the various functions of the system. The content is preferably stored in an object-oriented manner in accordance and in conjunction with the object model. The object model is utilized to provide the appropriate content to a user in accordance with the user's learning profile and/or level with a learning chain of a learning plan, along with a user's hardware profile. The object model is preferably accomplished utilizing a metadata structure.

In one form, the above is implemented utilizing the latest computer/Internet technology coupled with the GEM prototype program. An education plan is developed for each student. The educational plan includes, but is not limited to, a user profile, a hardware profile, and a testing profile. A template or palette will be developed from the various profiles that determine how each user learns and how to present the educational content to the user. Contemporary, multi-tiered, Internet browser technology (e.g. HTML, XML, VRML, HTTP/IIOP, Visual Basic, Active X, Javascript, etc.) is integrated to a user presentation level using object oriented modeling and standards (e.g. OODBMS, Java, XML, RDF, CORBA, J2EE, OLE, COM, API, etc.) coupled with relational databases (e.g. SQL, Oracle) to reach every web-enabled device (user) on the Internet.

From the individual perspective, a learning template consisting of a user's learning proclivities and/or preferences will be interactively developed preferably via a proven set of GEM testing and remediations. The learning template will also be continuously and dynamically updated based on factors such as performance (testing) on previous lessons/educational material. This specialized template is then correlated to a learning style and an appropriate philosophy is used for instruction. The primary hardware tool is the personal computer or Internet capable networked device, which will provide the medium for continued training. The educational content is provided in an appropriate format to the Internet capable device in accordance with the hardware profile. With existing technology and planned future developments, an object-oriented and/or relational database routs activities to satisfy the educational needs for each template linked to every concept in education, industry, work force, social skills, and the like.

In one form, the educational material is culled or gathered from the vast ocean of information and/or content already available on the Internet. This Internet information or content would be filtered, evaluated and/or indexed to become educational material or content, and then linked to template or profile characteristics. The object-oriented fabric of the system then serves to push the educational and/or informational content in accordance with the learning style to the user based on the template. An intelligent software program serving as a programmable agent may act as a filter and coordinator of information tailored for individual use (i.e. via the template) while GEM program specifics may be used to assemble the information/data for the user/student.

The template or palette will be determined by identifying the potential strengths and needs of each individual to produce a total learning template or palette. It is well known that realistic expectations enhance learning; improving interpretation of needs, creating a healthier emotional atmosphere, better parent/teacher/student understanding, communication and a stronger educational climate. These are some of the rewards of this essential effort. It is critical to identify "uniqueness" in the individual. The present invention advocates a close, continuous "look" at the student and a curriculum with limitless computer assisted learning activities built upon that resulting template. As well, the present invention captures the picture of the total individual rather than only one aspect of learning. This picture results, in a coordinated, multifaceted interpretation of potential, and is then shared with all those who would be incorporating this interpretation into a developmental template for assisting the person in living in and learning about the and/or their environment. In this manner resources are brought to the individual, not the other way around.

Proper profiling of learning ability to produce the template or palette is accomplished through examination of motor processing, auditory processing, visual processing, language, and basic concept development, physical, emotional, environmental, sensory, and spiritual cognitive development. Template or palette identification through genetic evaluation and/or sensing of human neuro-biological indicators (bio-factors) may also be used as input to a profile. By analyzing this developmental set of interrelated attributes, learning strengths and preferences can be identified. The collected data (template composite) serves as a reference for measuring educational growth for each individual. As an example, a template may be compiled through the following steps:

First—Use the GEM testing format to build a template for each student on how he/she learns and functions. This template will be stored relationally in a database. Most material and testing will be done via the computer. A minimum number of test items will be administered separately and entered manually into the computer. The template will be changing as the student evolves. Most of this material can be taken directly from the existing documentation.

Second—An automated computer retrieval/database system will provide students and/or teachers/parents activities for students to learn a concept based on the developed template. The database of learning activities is compiled from both existing Internet resources and contributed material that will be continuously expanded and/or updated. Instructional Examples ("IEs") may be added in the database to those that have already been detected online. Before adding any IE, they will be screened through a selected team of individuals or an individual knowledgeable in each category and subject area of education, or via an automated version by modules of artificial intelligence. The IE's selected for a given concept will be based upon various evaluation criteria preferably according to GEM principles. Each IE will be coded or indexed to certain types of learners according to their template. Some may even be used for all types of learners. The traditional Learning Chain will be evolutionarily enhanced over time.

Parents, students, educators, etc. will also provide IE's and they will be channeled to the right teams. The IE's produced will be used in many ways: for example, virtual reality, for the tactile and kinesthetic learner; voice for the auditory, videos, for demonstration, and printed word for the visual. The IE's will be gathered, developed, coded, stored, added to existing internet IE's and retrieved via the object-oriented database (OODB) management tools for every learning concept in education. Commercial educational software providers can supply programs IE's, etc. that can be certified and templated that may or may not be on a fee basis. The database of IE's will be added to or deleted as better methods are developed. As new concepts are added to education, new IE's for each template will be developed, screened, selected and added. The world's best educational examples will be available to every individual. A level playing field for all people regardless of race, physical impairment, ethnic background, etc. to progress through the Learning Chain.

Third—The majority of the concepts and communication will be accomplished via a web-enabled computing or processing device (WEC). Based upon an individual learning template, and preferences the system will present a concept accordingly through appropriate education content that has been formatted accordingly. Educational content will be selected according to the student's total template, level of development, and position within a learning chain of the educational plan. This is done under supervision of the educator.

Fourth—The home WEC can be used for projects or lessons away from a classroom. Each individual will have a unique identity (i.e. social security number and password), and will work select activities or be provided select educational content according to individual template for learning, and correlated to the concept on which they are working. Parents may also "log on" and bring up activities they can present to the younger student.

Fifth—A complete tracking system will handle all records, achievements, template updates, etc. to gauge the success of the program. This same information is available to the individual to assess achievement.

In accordance with another aspect of the present invention, an overseer is provided with a correlative program of products and services through the Internet and related technology. Parental awareness of the child/student as a member of the family should correspond with his or her needs and the specific individually prepared program. This process makes it possible for the first time to teach each child at his/her own intellectual and motivational level, utilizing the most appropriate mode of learning and advancement, in an individual or conventional group setting. The facility of this process promotes teacher compliance and makes it readily usable by parents and students as well.

In accordance with another aspect of the present invention, work will be performed with individuals of varying degrees of intelligence and ability. It includes all classifications of special education. The unique evolutionary design adjusts automatically to different demographic characteristics and is accessible across all lines of gender, race, national origin, disability, age, etc. It is considered to be culture-blind.

At the heart of this process is the individual learning palette comprised of hundreds of elemental rungs, built from sensory, perceptual, and motor interplay, which are interwoven and then translated into their corresponding behavioral, academic, and coordination states. These areas of physical and cognitive endeavor, in turn embrace another magnitude of evaluative strategies, physical-medical treatments, therapeutic techniques, and educational remediations. The benefits of this implementation cannot be fully fathomed at this point, however; some of the immediate advantages are intuitively obvious:

The cost of education could be drastically reduced;

Potential realization of world wide education tailored to the students learning template;

Students can progress at their own rate and pursue studies on their own;

Individuals can learn in depth areas of interest outside of the classroom;

Student and administration workload would be greatly minimized;

Underprivileged or ethnically diverse students will have templates and educational remediations tailored to their unique learning style;

The opportunity for parent and teacher enhancement of the overall teaching process;

More communication and understanding;

Consistent education on contemporary problems like drugs, terrorism, gangs, weapons, criminal justice, population growth, etc.;

A real time understanding of the user's template and educational level;

Students will be able to continue the educational process year around and at any time or place, to provide better association with their family and social setting;

Interaction among students can now become much greater than just the immediate classroom. They can be linked on a global basis and understand their intellectual position from a global perspective;

Using this medium and this level of interaction to make the educational process stimulating can reduce time now spent watching non-educational television programs. Contemporary TV will merge with Internet capabilities to facilitate expanding video, interactive, and virtual reality tools;

Continuing education and retraining programs can use this technology efficiently and economically;

Adult education and on the job training;

Military training can be upgraded and made more efficient;

Better teacher morale since: 1) Their time is freed to teach; 2) They no longer have to spend hours planning screening tests, developing teaching plans, formalizing parent—relation programs, making reports, detailing accountability; 3) Teacher confidence is strengthened since they know what to do with the students. They have definite plans and parent action coordinated with the support of the school; 4) The total program is organized, prepared and provided for them coupled with their own enhancements; 5) It provides for more effective teaching methodologies for the entire classroom as well as the individual; and 6) They get written, fully detailed "what, when, how, who, why" information through the present invention known as Mindshare™ or the Mindshare Solution™.

Less disruptive behavior with happier children since: 1) The programs they enter are equal and of the best quality; 2) Their frustrations are being alleviated; and 3) their total personal needs are being given prime consideration;

Better parent cooperation/school relations since: 1) Parents know what is going on; 2) They are fully informed "why, how, when" and "what is in progress"; 3) They are formally recognized, conferred with and shown how to share in the action plans including at-home activity programs; 4) Parents get their own Mindshare program to follow—coordinated with the school program; and 5) The family also is drawn closer together through better provision of intra-family understanding/stability/goaling focused on the strengths and needs of the student.

Improved educational environment since: 1) Each school-staff member's role is clarified and included in the program; 2) All are working together on an agreed upon plan; and 3) All are working toward one explicitly stated goal . . . to help the student.

Assured accountability for the teacher since: 1) They have selected a comprehensive, soundly professional method and program (GEM), that is internationally recognized for effectiveness; 2) Their implementation of the method and program is verified by programmed action plans; 3) Enhancement of community awareness/cooperation through accountability to the School Board; 4) Efficiency in relationships with community professional and trade associations; and 5) Effectiveness in interfacing with the social providers of the community.

In yet another form, the subject invention is a web based, enterprise-wide, knowledge management system, apparatus and method (collectively, "application"), that uses a semantic engine to mine or gather relevant information from a variety of sources, especially that of the Internet. The application delivers the mined content in a format that users can refine and annotate. Supporting both individual users and communities of interest, the application archives valuable content, such as queries, returned documents, and refined documents, for future access.

The application is built on a semantic engine and a user-editable GUI. The semantic engine supports searches and organizes post-search processing. The subject application enables advances in linguistic processing through a user editable generic English lexicon and other tools that assist in clarifying meaning. Also, the user can augment the lexicon with user-defined concepts.

The semantic engine analyzes an area or areas of interest for key concepts and then presents the user with a range of answers for each concept. The user refines the area of interest by selecting the best answer and weighing each concept's importance in relation to other concepts. The application then translates the interest into a complex Boolean query suitable for a variety of search engines. It enhances the query by supplementing key concepts from the user defined preferences and palette information during the translation process.

Search engines, such as Alta Vista, typically search a document's metadata (document title, source, date, summary sentences, and other fields) to determine if the document matches the search criteria. Mindshare can work with several search engines at the same time to provide enhanced queries. The enhanced queries increase the effectiveness of the search engine's retrieval activity. Once returned, all search engine results are then refined.

Mindshare sets a relevancy threshold for returned documents using a mathematical algorithm. The algorithm, designed to analyze the sequence of thoughts in a document, determines if those thoughts are relevant to the user's palette. The algorithm operates paragraph by paragraph in a document, looking for the paragraph with the most relevant thought and delivery mechanism. Based on the user's input, a combination of concept weighting and desired relevancy score ranks the paragraphs. Periodically users are asked to baseline and test the validity of the palette information. For example, in this mode of operation, users assign one of three weights to each concept: key, regular, or ignore. A key concept weighs twice that of a regular concept. An ignore concept has a weight of zero. Ignore concepts prevent the subject application from spending computation resources on conjunctions, prepositions and other extraneous parts of speech. For example, the user then selects the desired relevancy level (score or percentile range between 0 and 100) that a response must meet to be categorized. To calculate relevancy, the subject application locates the most relevant paragraph in the document and calculates its weight. A 50% relevancy level means that the most relevant paragraph in the document must contain at least 50% of the responses total possible weight. Should the document's most relevant paragraph contain all of the possible concepts, the subject application further analyzes the paragraph by order of concepts in the paragraph versus order of concepts in the interest.

The subject application post-search activity saves users significant time by focusing the user's attention to only those paragraphs in a document or documents that are considered relevant. Duplicate documents and documents with content that did not meet the use-specified relevancy threshold are deleted. The subject application's semantic engine identifies and hyperlinks key concepts in the remaining documents. The user then quickly navigates through selected paragraphs that contain key concepts. A document is then analyzed with all of the user's active interests each time that document is opened, including documents saved to a user or group repository. Thus, the unexpected correlation of different concepts found in the same document gathers new knowledge.

The user can save the original document, not just the relevant paragraphs. Dragging and dropping saves documents metadata (source, date, author, and other user defined fields) within the GUI. The user can annotate any object (documents, folders, and metadata) in the repository with pertinent information that makes the document useful not only the user, but which also updates the palette information for future comparison searches.

Saving and linking exceptionally useful documents and folders to appropriate concepts keeps the palette current with use of discipline-specific vocabulary. It also indexes reference work for use by others via palette mapping to the enterprise. This enterprise memory is a permanent record of lessons learned, accessible to any individual using the system.

Mindshare is a state-of-the-art, J2EE java-based rich client/server architecture and includes a set of commercially available enterprise applications. Standard Webservers provides an operating environment that is easily deployed in a variety of server/workstation configurations and across the Internet. Computationally intensive tasks are placed on the distributed servers. The workstation hosts a "thin or rich client" that manages the user interface. Users can connect to the application with Internet accessible workstations that have the application rich client installed to access their repository at work, from home, and during travel. A user's repository opens in the state the user last left it, no matter where or when the user logs into the system. This virtual educator allows users to work on a project at times and places that match their personal schedule. The virtual teacher also keeps users in contact with information that matches their educational level and/or user information preferences retained as palette characteristics.

The subject system utilizes an enterprise relational database management system (RDBMS) for content storage. A document management system to store non-hypertext markup language formatted content is supported. Additionally, third-party tools can, as necessary, access content for additional analysis and process.

Further, the subject system interoperates in today's enterprise information technology (IT) environments. These environments typically are collections of disparate data sources from personal systems (e.g., Microsoft Access), legacy databases, and current RDBMS. The subject system works with all these sources through application programming interfaces and search engines to access data without disrupting normal operation, and requires minimal IT support. Users manage most of the operational configuration through administrative components. The system identifies the user's client computer capabilities for processing and display and provides data to meet those parameters. It is capable of presentation in the "thinnest" client mode of HTML for inexpensive interaction. Mindshare will also take advantage and recognize fuller function clients for instruction via video, audio, virtual reality sensory/feedback, etc.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views.

DETAILED DESCRIPTION OF THE INVENTION

As used herein:

The term GEM stands for Glancy Educational Method. GEM is an existing approach of student evaluation for the purpose of tailoring educational content to an individual's PALETTE or learning profile to maximize cognitive assimilation.

The term PALETTE stands for Psychogenetic and Audiometric Learning Template, Tailored Evolutionarily. The word template is generally synonymous with PALETTE or learning profile.

The term Learning Chain is the typical and/or known logical progression of skills required to master a given subject or topic (e.g. a student will learn geometry, trigonometry and calculus in a prescribed order).

The term ebot or spider is a software agent/program that is deployed to perform tasks on the Internet without direct guidance. Ebots perpetually navigate the Internet performing complex tasks such as abstraction, encapsulation, modularity, reusability, concurrency and distributed operations. In the framework of the present Mindshare system, an ebot is used to search, catalogue, classify and/or categorize Internet content into packets of data according to learning proclivities and/or preferences. This knowledge agent will automatically gather information and map it into the optimum palette (learning profile) format.

The term educational portal is an interface into a vast amount of information that has been tailored to meet the specific learning style and capability of the student. The user interface is evolutionarily adapted to meet the individual palette.

Figure 1:
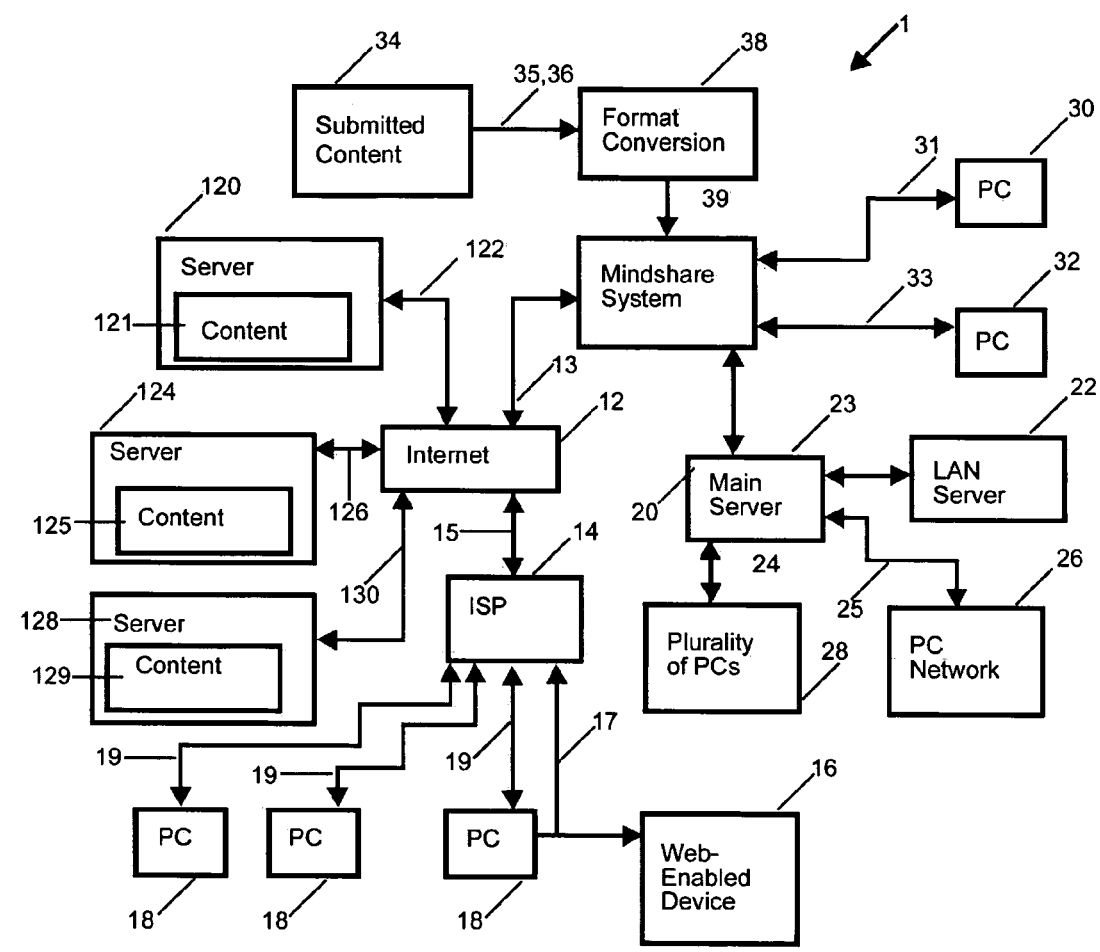
FIG. 1 is a representational block diagram of an exemplary system incorporating the principles of the subject invention.

Referring now to FIG. 1, there is depicted a representation (e.g. block diagram) of an exemplary embodiment, generally designated 1, incorporating the subject invention in accordance with principles presented herein. A server/database/system 10 as is known in the art represents the Mindshare System/Program (hereinafter "system") being a logical system and database. The system 10 may be many individual systems networked to one another rather than a single system.

The system 10 is configured, operative and/or adapted to obtain and/or create a learning profile for an individual or user, search the network, Internet or the like for learning material/content, obtain data regarding the material/content which may include cataloguing, classifying and/or categorizing the learning material/content, correlate the learning material data to a user learning profile for providing the material/content to the user in accordance with the learning profile, testing the user, redefining the correlation between the learning profile and the material/content, redefining the learning profile and more as described herein. The educational material consists of still pictures or frames, video clips, audio clips, and/or any other type of multi-media formatted information/data culled from the Internet. Such educational material may be formulated into lesson plans, connected learning modules, etc. or any other assemblage of information/data that is deemed to constitute instructive content (IC).

As well, the educational material includes submitted content 34 that is forwarded to the system 10 by third parties who desire for the material to be included. The submitted content 34 may be forwarded via electronic means as signified by the bolt 35, or by other means as signified by the arrow 36. As with all educational material, the submitted IC is evaluated for suitable content, indexed, and linked to the learning profile characteristics, preferences and/or proclivities. This object-oriented fabric of the system 10 then serves to push data (provide the material) and learning style to the individual based on the learning profile. A program director (i.e. a group of individuals or a single individual) or a programmable/automatic agent (i.e. a computer program) acts as a filter and coordinator of educational material/information tailored for individual use while GEM Mindshare program specifics will be used to assemble the information/data.

The submitted content 34 may need to undergo format conversion 38 before storage in the system 10. Such format conversion 38 may be scanning via a scanner (not shown) of a document or documents. Format conversion 38 may also be conversion from, for example, "JPEG" to "GIF" formats, or similar format conversion.

With submitted content 34, the originator and/or supplier could be charged a fee to consider and/or use the content within the context of the Mindshare Program. An ongoing fee for use of the submitted content (now educational material, assuming the same is approved for use by the program director/programming agent) could be calculated based on the number of times the educational material is accessed. Of course, other schemes for calculating fees for use may be used.

As well, the system 10 is connected to the Internet 12, as signified by the line 13, in order to obtain resource(s), material(s), and data (collectively "content") available via the Internet 12. This is represented by the server 120, the server 124, and the server 128 (the servers 120, 124, and 128 thus representing all or the plurality of the servers or the like of the Internet 12, while the content 121, 125, and 129 represent all of the material/content of the Internet 12). The server 120 contains content 121 that is accessible to the system 10 via the connection 122 via the Internet 12. The server 124 has content 125 that is accessible to the system 10 via the connection 126 via the Internet 12. As well, the server 128 has content 129 that is accessible to the system 10 via the connection 130 via the Internet 12. The content 121 may be educational, learning, informational or the like and is obtained from the various servers by the system 10.

In accordance with an aspect of the subject invention, the system 10 gathers content or material from the various servers via the Internet 12. Particularly, the system 10 looks for specific content from the Internet 12 based on learning, educational, or informational need of a user. The learning profile of a user may be consulted to seek the particular content. The content is then gathered by the system 10 and then stored thereon. More particularly, the system 10 may utilize a semantic engine, ebot, spider, etc. to seek and retrieve content that is appropriate for the particular user. The content/material may be stored as data regarding the content, elements or characteristics of the content, or both. The user may, according to an aspect of the subject invention, provide various queries for information via a graphical user interface (GUI). In another instance, a specific educational, learning, or information plan may seek and select the appropriate content from the Internet 12. In both cases, the user's palette is preferably utilized to correlate the gathered content to the specific user.

The learning profile may also provide management of the content sought, gathered or collected, and provided to the user. Since the content from the Internet 12 is typically in a "raw" form, the gathered content may need to be filtered before it can be provided to the user. The content may not be appropriate for a user for various reasons, such as age, learning or chain progress problems, or the like. Filtering may include editing the content so that it is suitable for the user in the various respects noted above, as well as for the information or learning content thereof. Filtering may also include providing only some of the content from an Internet page or site. Further, the content may be evaluated for suitable content, indexed, and linked to template or profile characteristics. The program director or programmable agent would as well, review the content before making the same available as provided content. Since the content from the Internet 12 is free, there is no fee charged to an Internet (web) site for its use. A web site may, however, be charged for content use depending on the circumstances.

The educational material or content that is chosen, selected, or gathered in response to the system 10 needing to obtain content for providing learning or information to a user is processed by the system 10 according to the user's profile. The content may be stored on the system 10. The system 10 also formats, reformats, or converts the content in accordance with the user's profile and/or the user's hardware profile such that it is provided in a format or level that is appropriate to the user. This typically involves formatting into contemporary, multi-tiered, Internet browser technology using HTML, VRML, HTTP/IIOP, Visual Basic, Active X, Java-script, XML and the like. Further this may involve integrating the content to the presentation level using object oriented technology and standards such as OODBMS, Java, SQL, Oracle, CORBA, OLE, SOAP, Websphere™, Metaphase™, and the like.

As depicted in FIG. 1, the presentation level material (content provided by the system 10 to the user) from the system 10 may be accessed by or via an Internet Service Provider (ISP) server 14 shown as in electronic communication with the server 10 via the internet 12 as indicated by the bolt 15. The system 10, of course, would have an Internet address such as "www.mindshare.edu". A home personal computer (PC), workstation, or web-enabled device 16 (collectively "PC") is electronically connectable to the ISP 14, as signified by a line 17, via any known means (e.g. modem, ISDN, cable modem, satellite, TI connection, or the like). As well, the PC 16 may be a custom "system" device. The PC or Web 16 preferably runs an Internet browser as is known in the art or a custom system platform. The PC 16 is thus adapted to receive content or educational material on the presentation level as described above through the system or Mindshare HTML/Java/XML/etc. program. As well, the PC 16 would be able to run the System GUI as explained below. The System GUI allows the user to formulate content requests that the system 10 would carry out in the same manner as the system 10 gathers and processes any content in accordance with the present principles.

A plurality of PCs as indicated by a second PC 18 is electronically connectable to the ISP 14, as signified by a line 19, via any known means (e.g. modem, ISDN, cable modem, TI connection, or the like). As well, the PC 18 may be a custom Mindshare device. The Web 18 preferably runs an Internet browser as in known in the art or a custom Mindshare platform. The PC 18 is thus adapted to receive content or educational material on the presentation level as described above. As well, the PC 18 is configured/adapted to run the System GUI.

There are other means to access the Mindshare system 10 as indicated by server 20 in semi-direct electronic communication (not via the Internet) with the Mindshare server 10 as indicated by the line 21 via any known means (e.g. modem, ISDN, cable modem, TI connection, or the like). Additionally, a remotely located LAN/WAN or other network server 22 may be in electronic communication with the server 20, as indicated by the line 23 via any known means (e.g. modem, ISDN, cable modem, TI connection, or the like). Representing a plurality of networked PC's are PC 26 and PC 28 coupled via network 24. This may represent a school, school system, business, or other network environment that can gain access to the Mindshare system 10 and use the Mindshare Program/System as described herein.

Further, additional PCs 30 and 32 may be directly coupled to the Mindshare system 10 via a network or individually. These PCs may all connect to and allow participation with the Mindshare system in accordance with the subject principles. Anyone who has access to such a web-enabled device may therefore gain access.

Figure 2:
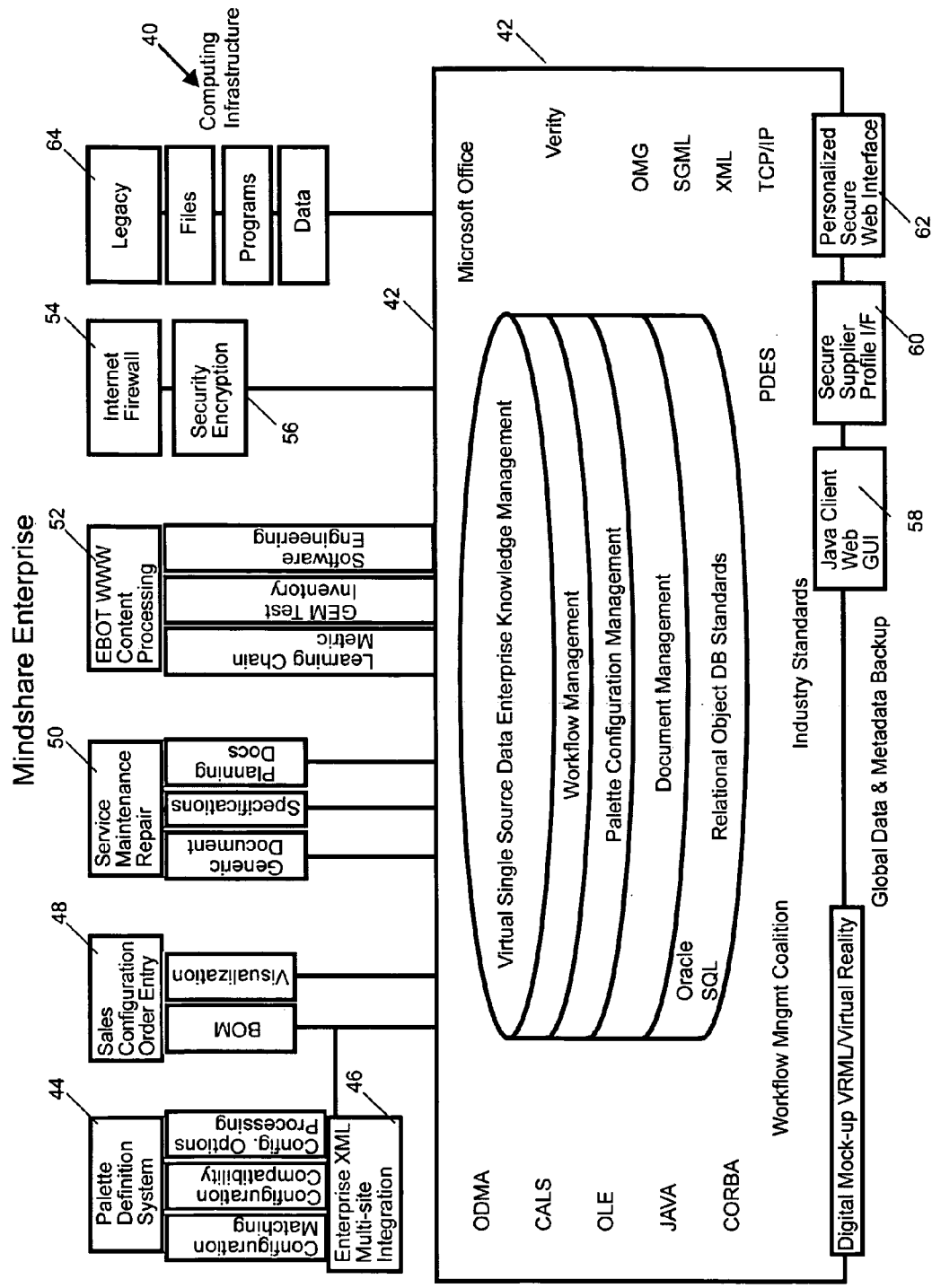
FIG. 2 is a representational diagram of the computing infrastructure of the subject system.

With reference to FIG. 2, there is shown the Mindshare system 10 computing infrastructure generally designated 40 that correlates, compiles, configures, oversees, implements, manages and/or controls the various aspects thereof. The computing infrastructure 40 includes a program management structure 42 that is tied together based on relational object database standards such as Oracle™ or SQL. Within the program management structure 42, workflow management, palette or profile configuration management and document management take place based on various operating environments indicated in the Figure.

The computing infrastructure 40 supports a palette or profile definition system 44 having configuration matching, configuration compatibility, and configuration options processing. The palette or profile definition system 44 is supported by an enterprise XMP multi-site integration 46 that ties the palette definition system 44 to the program management structure 42. The computing infrastructure 40 also includes a sales configuration/order entry 48 having BOM and visualization that is integrated with the program management structure 42. As well, service, maintenance and repair 50 also forms part of the computing infrastructure 40. Within the service, maintenance and repair 50 is generic documents, specifications, and planning documents.

The Mindshare computing infrastructure 40 also includes ebot world wide web (internet) content processing 52 for content located thereby. Such content processing includes learning chain metrics, GEM test inventory, and software engineering. As the ebot, knowbot or spider navigates the Internet for gathering content, the content located must be processed for appropriate user and any other criteria in order to make the same available to the user via the various profiles. As well, since the present Mindshare System 10 is preferably applied through the Internet, the computing infrastructure 40 includes a firewall 54 with appropriate security encryption 56, as are generally known in the art. Additionally, the computing infrastructure 64 includes an appropriate legacy environment 64 that includes files, programs and data.

In order for the user or student to be able to access and communicate with the Mindshare System 10 via the Internet (web), the computing infrastructure 40 includes a graphical user interface (GUI) 58 that is preferably Java enabled. Additionally, a secure supplier profile interface 60 is provided that allows an educational/content material supplier to securely send, rescind, and/or edit any educational/content material in accordance with the established procedure for review and/or inclusion of the educational/content material into the Mindshare system. As well, the computing infrastructure 40 includes a secure personalized web interface 62 for allowing a user secure access to information retained by the Mindshare system.

Figure 3:
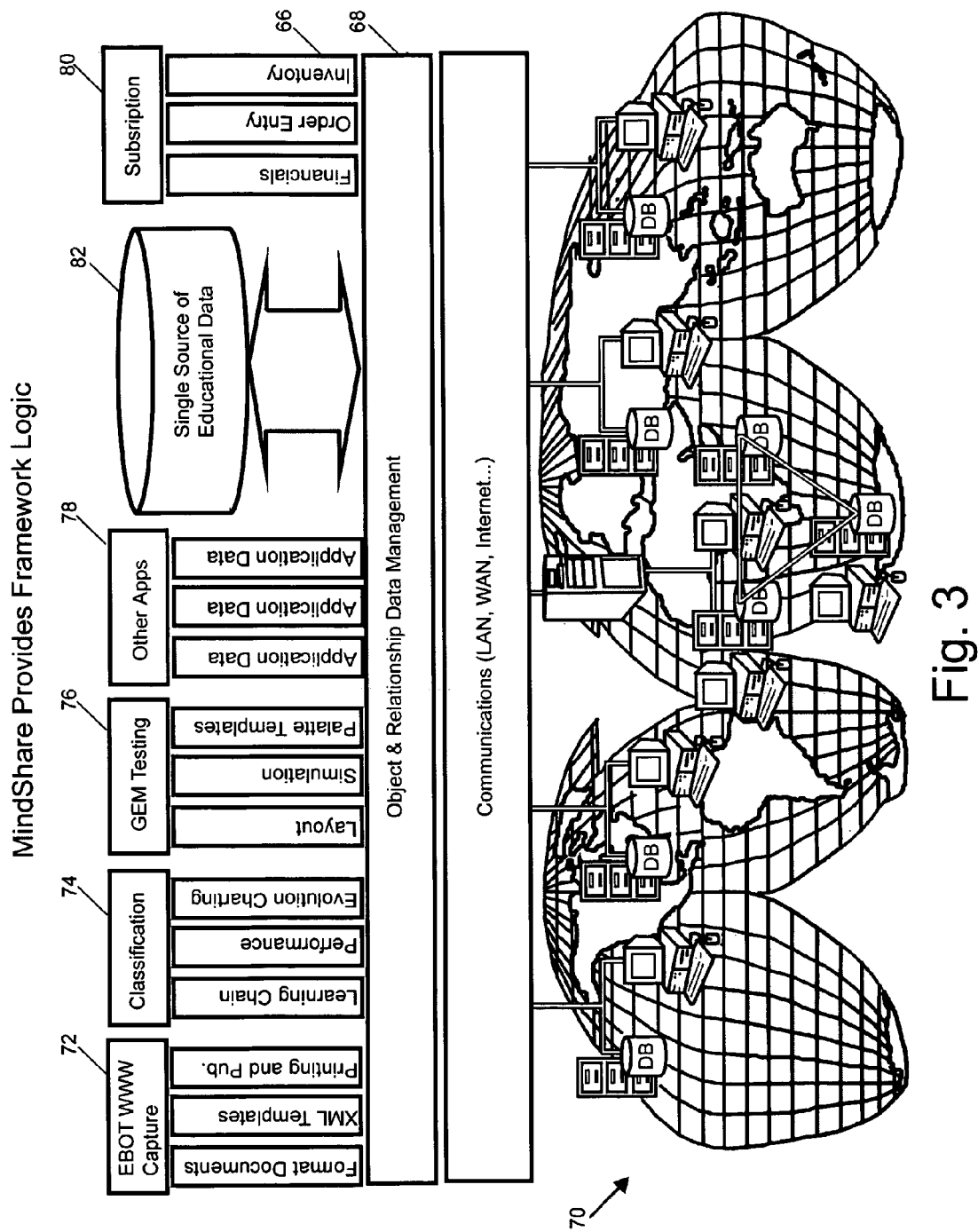
FIG. 3 is a representational diagram of the framework logic of the subject system.

With additional reference to FIG. 3, the Mindshare system 10 (see FIG. 1) includes framework logic to pull together the various aspects of the object and relational data management system 66 of Mindshare. As indicated above, the Mindshare system 10 is coupled to the world's web enabled devices (collectively 70) via various communication methods and/or systems 68. Of course, Mindshare includes the means necessary to implement the communication types and configurations depicted.

In order to create the single source of educational data 82 that makes up Mindshare, the object relational data management system 66 performs various tasks, some of which are depicted in FIG. 3. Ebot Internet capture 72 is implemented through the object and relational data management section 66. The ebot capture 72 includes form documents, XML templates, and printing and publication. As well, the object and relational data management system 66 provides classification 74 of the various educational/IC material from ebot, third party suppliers and the like. Such classification includes the learning chain, performance, and evolution charting.

In accordance with one aspect, the object and relational data management section 66 performs GEM testing 76 which includes layout, simulation where necessary, and generation of the palette/templates that are used to select appropriate educational/IC material that is stored in the Mindshare system 10 and/or available via the various multitude of pages of the internet. The object and relational data management system 66 also includes any other necessary applications 78 (including application data) to implement the various aspects of the Mindshare system described herein.

It is contemplated that various institutions, companies, and individuals will want to access and use the educational system taught herein as implemented by Mindshare. The Mindshare program contemplates profitability through various means such as tuition, third party submission of educational/IC material and payment for posting/use, advertising, and the like. In the case of tuition, those people, companies and the like who desire to use the Mindshare system will pay tuition and/or a subscription 80 for such use. The object and relational data management system 66 includes the ability to track subscription information such as financials, order entry, and inventory of educational/IC material.

Figure 4:
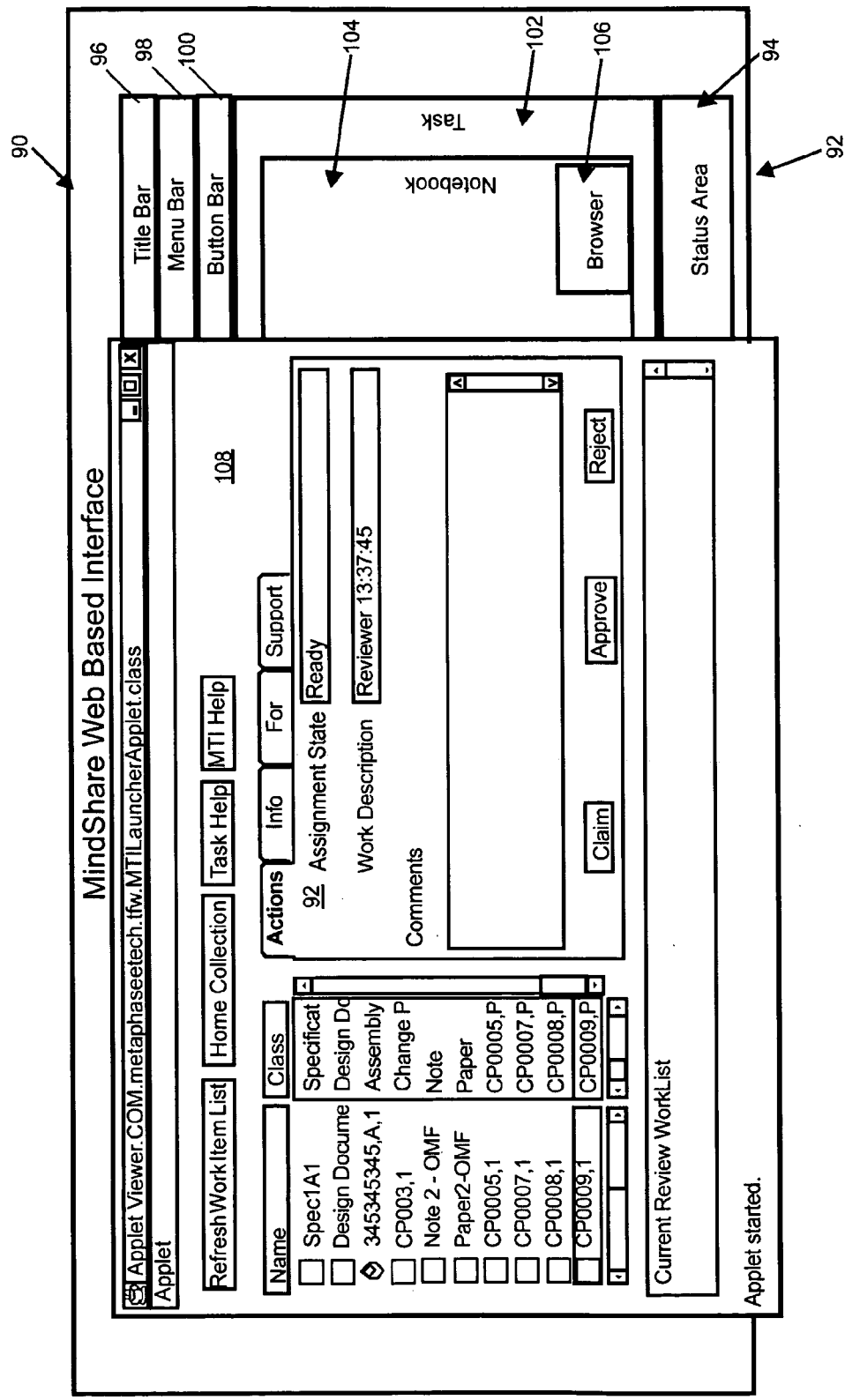
FIG. 4 is an exemplary program interface for the subject system.

Typically, it is only necessary for the web-enabled device to have a standard Internet browser or similar program in order to avail the user/student of the education provided by the Mindshare system. With reference to FIG. 4, an exemplary GUI 90 for access to, implementation and use of the Mindshare system is shown. It should be appreciated that since the GUI 90 is only exemplary, other styles/configurations may be used. The GUI 90 includes a mode area 92 that is used to select various GUI modes. These modes may include a status area 94, a title bar area 96, a menu bar area 98, a button bar area 100, a task area 102, notebook area 104 and a browser area 104. In addition, the GUI 90 includes a viewing/working area 108 in which the various educational/IC material is presented, tests are taken, scores/progress is posted, and the like.

The GUI 90 may also be used to initiate the system 10 into gathering information or content from the Internet for pushing or providing the content to the user. As such, the GUI 90 may include a semantic engine to aid the system 10 in retrieving content from the Internet, filtering the content according to the user's profile and provide the content to the user. As well, the system 10 may reformat the content as per the user's hardware profile in order that the filtered or edited content gathered from the Internet may be displayed on the user's system.

Figure 5:
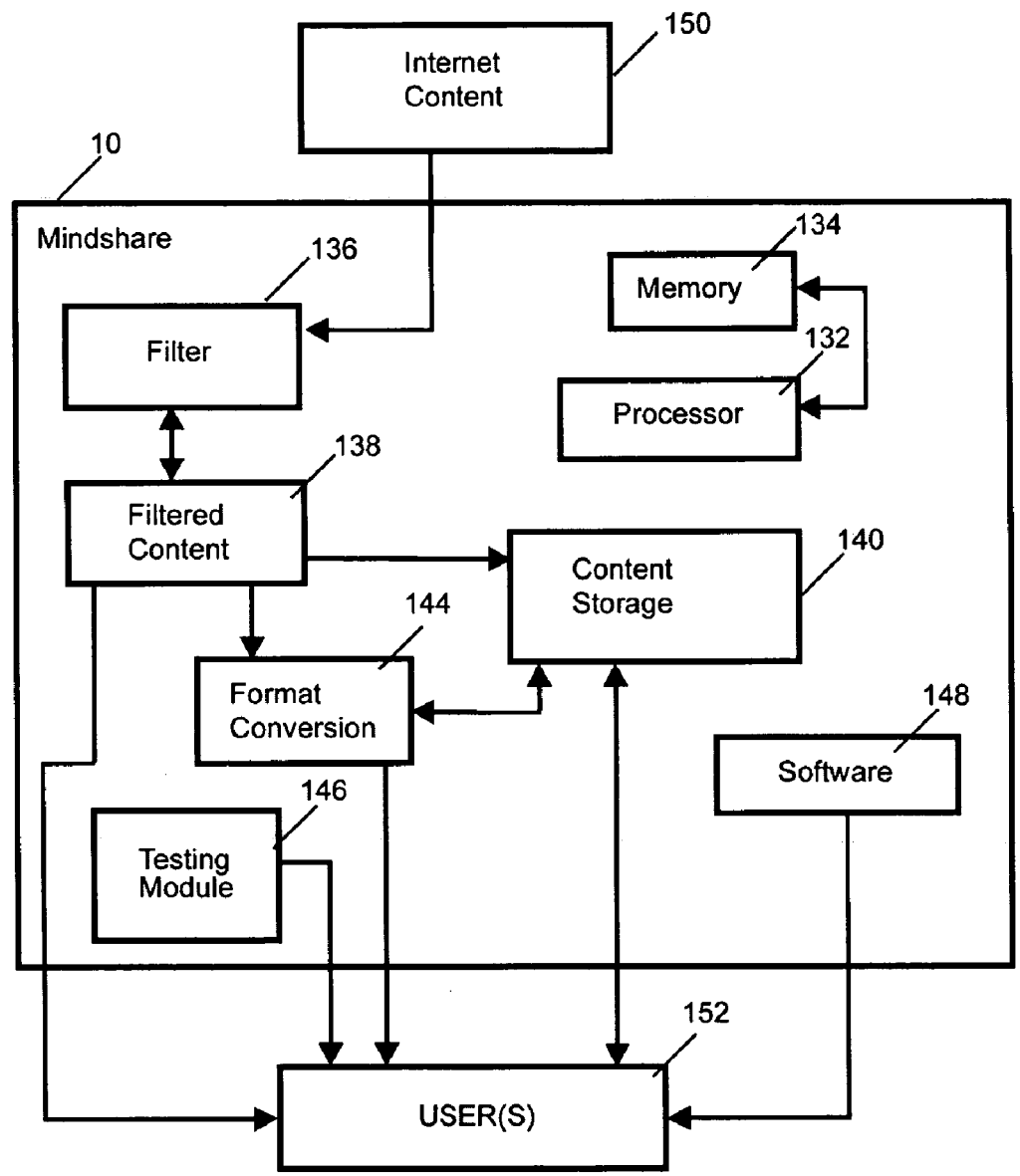
FIG. 5 is a block diagram of an exemplary system in accordance with the principles of the subject invention.

Referring to FIG. 5, a simplified block diagram of the system 10 is shown in accordance with an aspect of the subject invention. The system 10 includes a processor 132 and memory 134 that stores or contains program instructions to run or operate the subject invention in the manner set forth herein. While not shown, the processor 132 is in communication with the various components or modules of the system 10. The system 10 includes a filter 136 that receives Internet content 150. The filter 136 edits and/or parses the content according to the user's profile and/or the user's level within a learning chain of an educational plan (attainment level) or the user's current knowledge with respect to a chosen subject. This becomes the filtered content 138. The filtered content 138 may be stored in a content storage device 140 for later use. Later use may constitute re-presenting the content to the user if necessary, either in the same or different format, typically as a result of test results with respect to the content. Later use may constitute providing the content to another user. Both conditions are represented by the line to the user 152.

The filtered content 138 may be directly provided to the user (as represented by the line connecting the filtered content 138 to the user 152) or may be converted into another format for presentation or providing to the user 152. Format conversion 144 is operative to take the format of the content and convert it to another form. The converted form content from the format conversion 144 may be stored in the content storage 140 or provided directly to the user 152. The system 10 also includes a testing module 146 that is operative to provide testing of the subjects provided to the user.

Additionally, the system 10 includes software 148 that may be provided to the user to allow the subject invention to operate.

Figure 6:
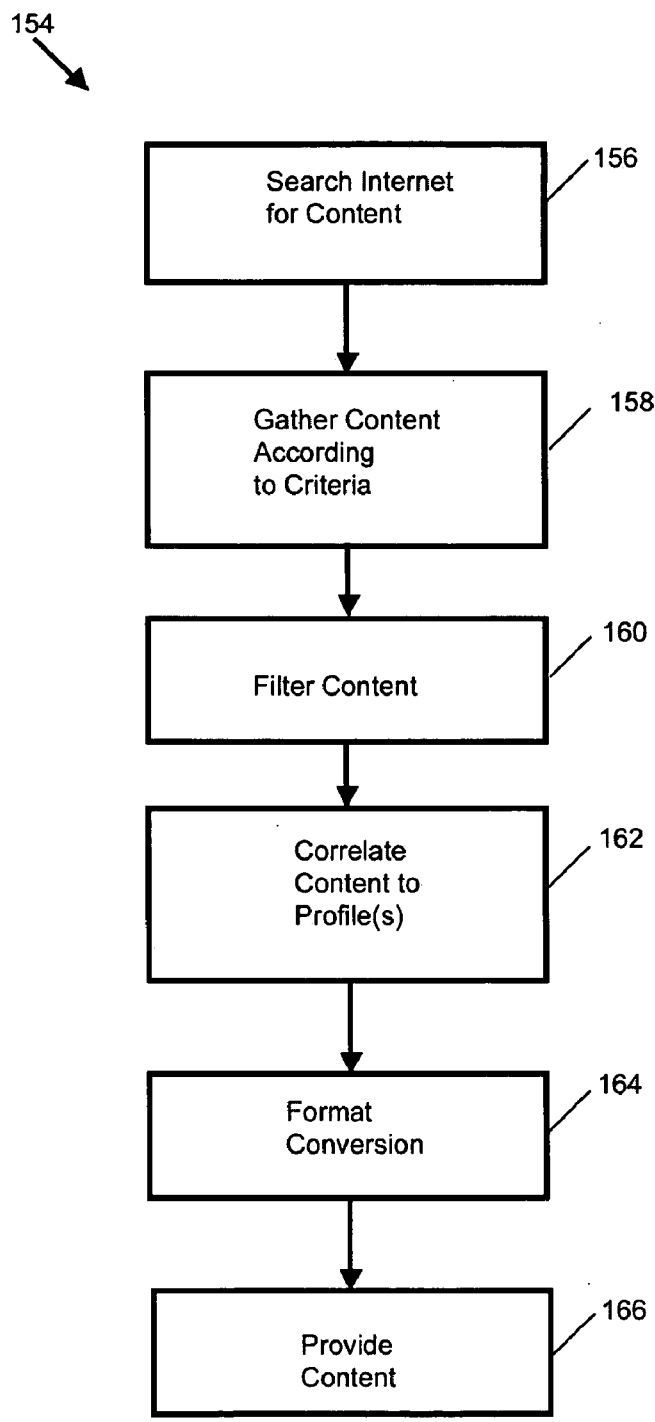
FIG. 6 is a flow-chart of an exemplary manner of operation of the subject invention.

Referring to FIG. 6, there is depicted a flow chart, generally designated 154, of an exemplary manner of an aspect of operation of the subject invention. Initially, in step 156, the system 10 searches the Internet for content. As explained above, content may be selected by the system 10 in response to an educational plan with regard to a particular subject, or may be selected by the user preferably with the aid of the GUI 90. In step 158, content is gathered by the system 10 according to various criteria such as the user's performance, previous interactive sessions, learning profile and/or hardware profile and subject matter. Content format may be a criterion. In step 160, the system 10 filters the content appropriately with regard to the various criteria. In step 162, the content is correlated to the profile(s) of the user. In step 164 the content is formatted accordingly if necessary. Thereafter, in step 166, the content is provided to the user preferably via the Internet.

Figure 7:
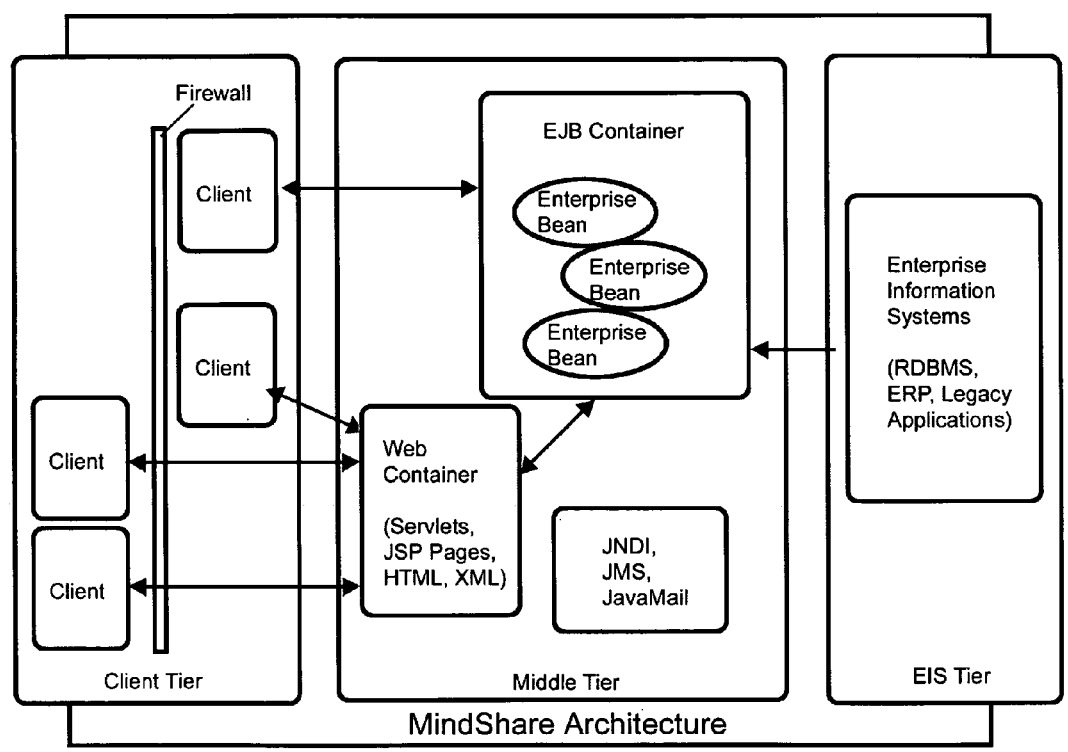
FIG. 7 is a diagram of an exemplary embodiment of the subject system utilizing J2EE application servers.

Referring to FIG. 7, the enterprise may consist of the client tier, the middle tier, and the EIS (Enterprise Information Systems) tier. The system 10 may be comprised of the middle tier and the EIS tier. The client tier represents the various users of the system 10. The EIS tier is the top tier that contains or is operative to provide the various information systems architecture or programming. The EIS tier interfaces with the middle tier that consists of an EJB (Enterprise Java Bean) container, a web container and a JNDI, JMS and Javamail architecture module. The EJB container contains a plurality of enterprise beans that interface with a client, the enterprise information systems, and the web container. The web container includes servlets, JSP pages, HTML, and XML programs/programming. The clients may interface with the web container if appropriate.

Figure 8:
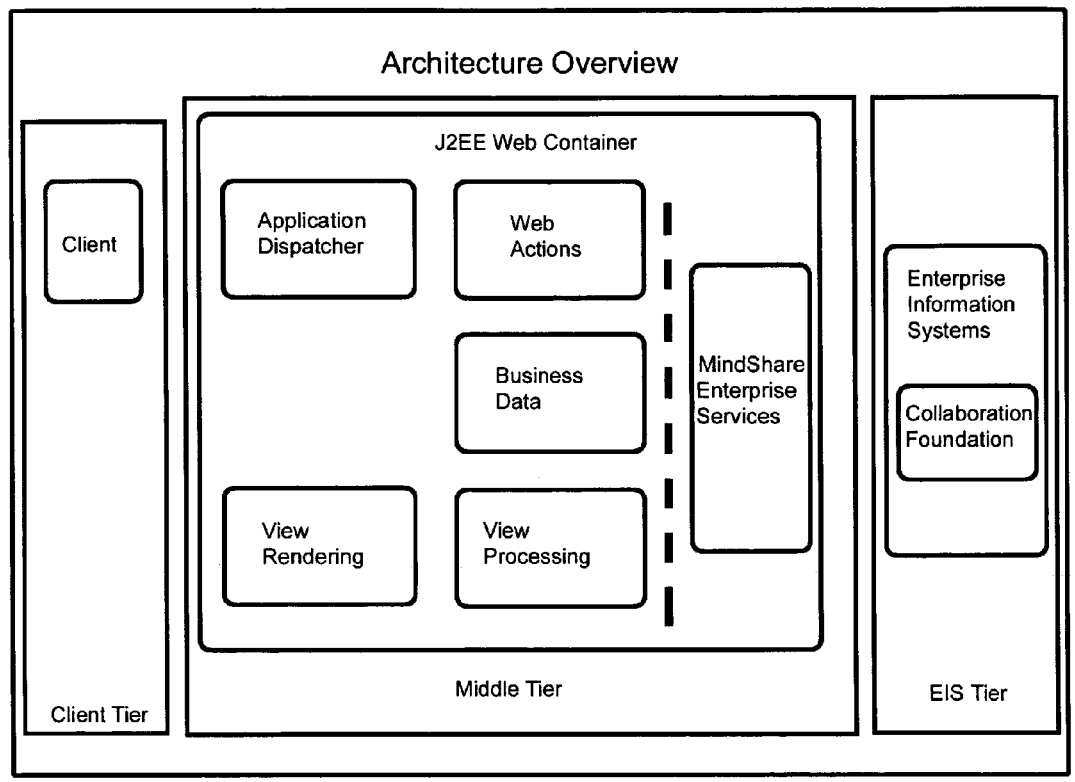
FIG. 8 is a diagram of an exemplary architecture of a portion of the system of FIG. 7.

In FIG. 8, an exemplary web container is depicted. The web container may be a J2EE container that includes an application dispatcher module, a view rendering module, a web actions module, a business data module, a view processing module, and an enterprise services module. These modules interact to provide a client with content as provided herein. The J2EE web container also interacts with the EIS, again to provide content to user.

Figure 9:
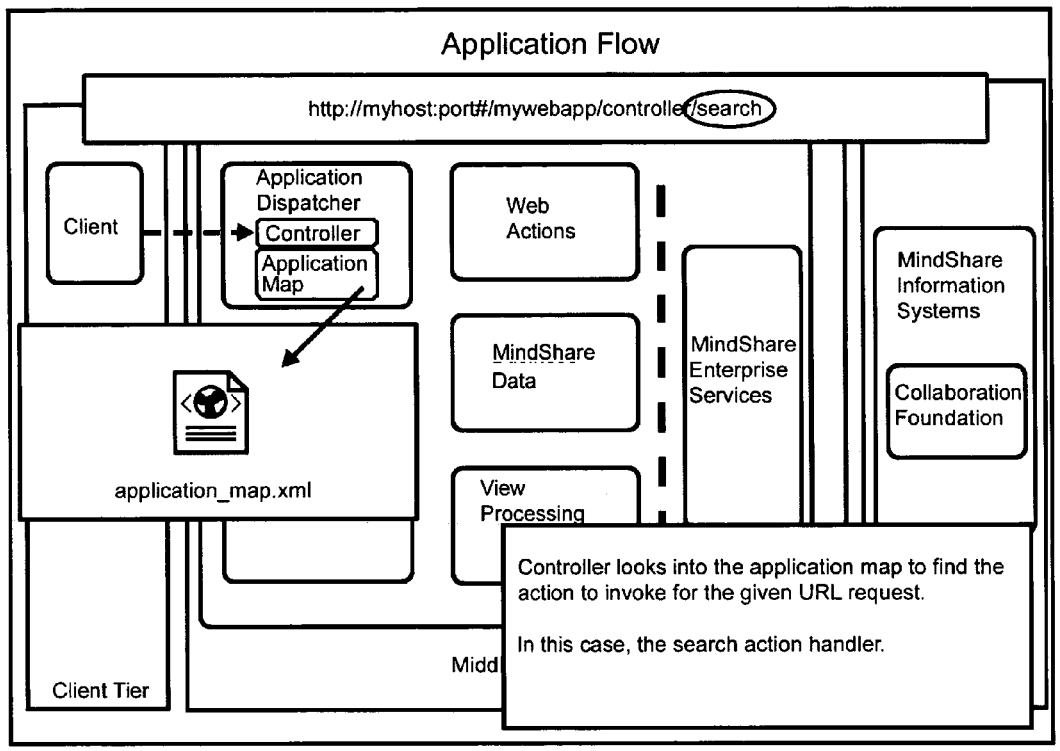
FIG. 9 is a diagram of a portion of system flow or a manner of operation of the subject system of FIG. 7 in accordance with the principles of the subject invention.
Figure 10:
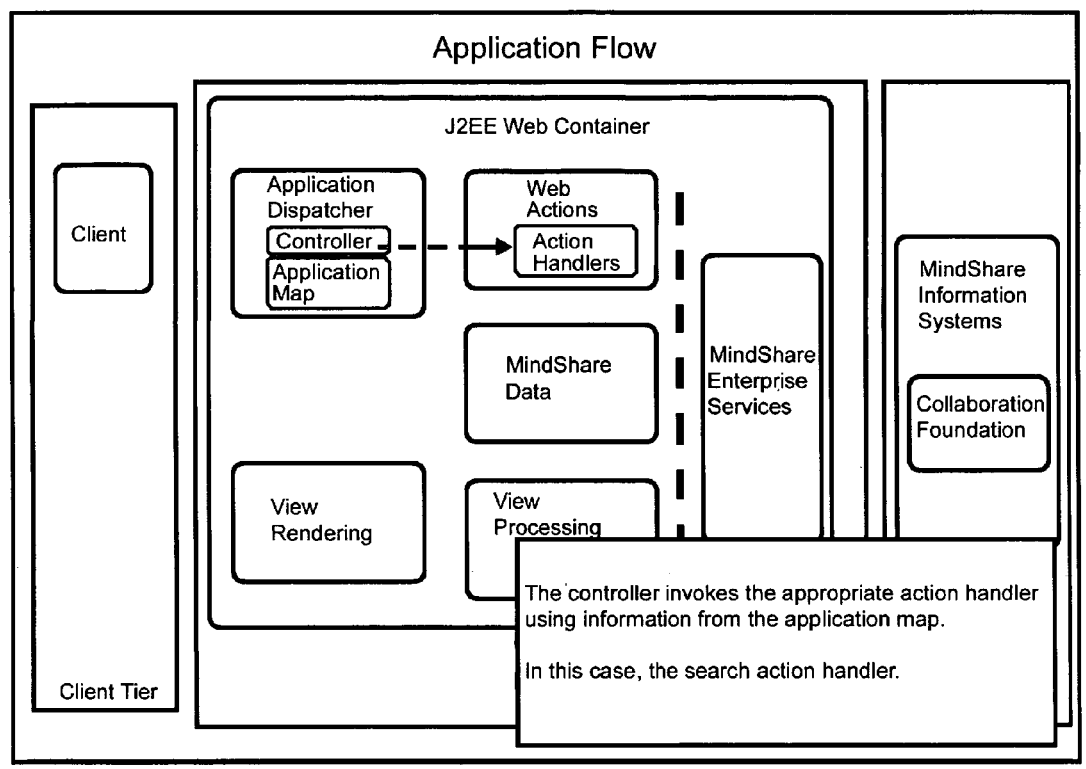
FIG. 10 is a diagram of a further portion of system flow or a manner of operation of the subject system of FIG. 7 in accordance with the principles of the subject invention.

Referring to FIGS. 9–16, there is depicted an exemplary manner of operation (application flow) with respect to the exemplary embodiment of the enterprise/system 10 depicted in FIGS. 7 and 8. In FIG. 9, the system 10 controller looks into the application map to find an action to invoke for a given URL request from the client. In this case, the application map (application_map.xml) finds the search action handler to invoke. It should be appreciated that the exemplary manner of operation may be extrapolated to a content search and retrieval for a subject. In FIG. 10, the controller, having found the requisite action, invokes the appropriate action handler using information from the application map. In this case, the appropriate action handler is the search action handler.

Figure 11:
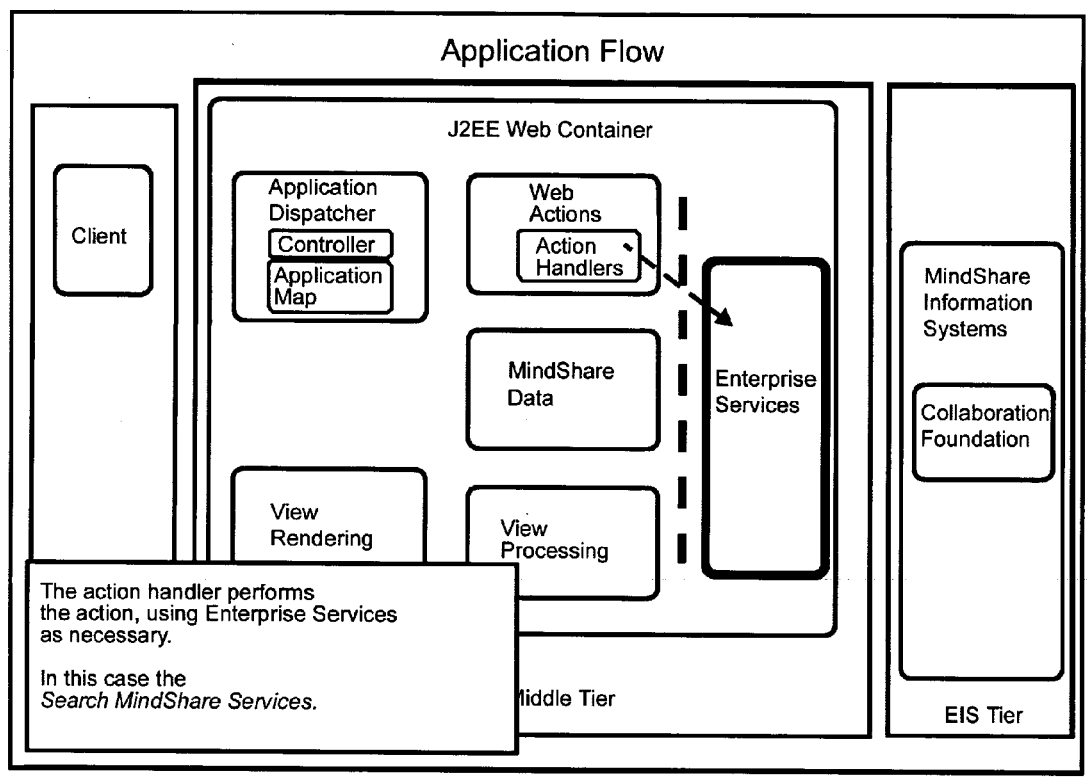
FIG. 11 is a diagram of a further portion of system flow or a manner of operation of the subject system of FIG. 7 in accordance with the principles of the subject invention.
Figure 12:
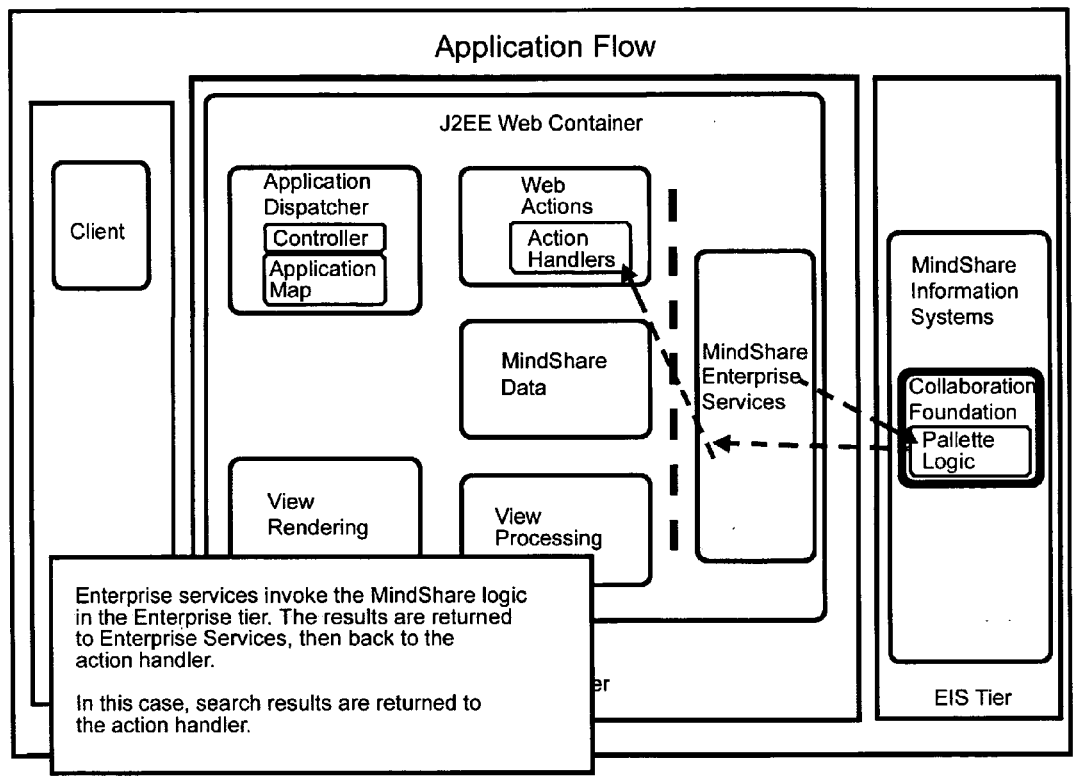
FIG. 12 is a diagram of a further portion of system flow or a manner of operation of the subject system of FIG. 7 in accordance with the principles of the subject invention.

In FIG. 11, action handler performs the particular action requested, using the enterprise services as necessary. In this case, the enterprise service is the Mindshare system. The enterprise service invokes the Mindshare logic in the enterprise tier as depicted in FIG. 12. The Mindshare information systems utilize profile or palette logic to perform a search, the results of which are returned to the enterprise services, then back to the action handler. In the present instance, the search results are returned to the action handler.

Figure 13:
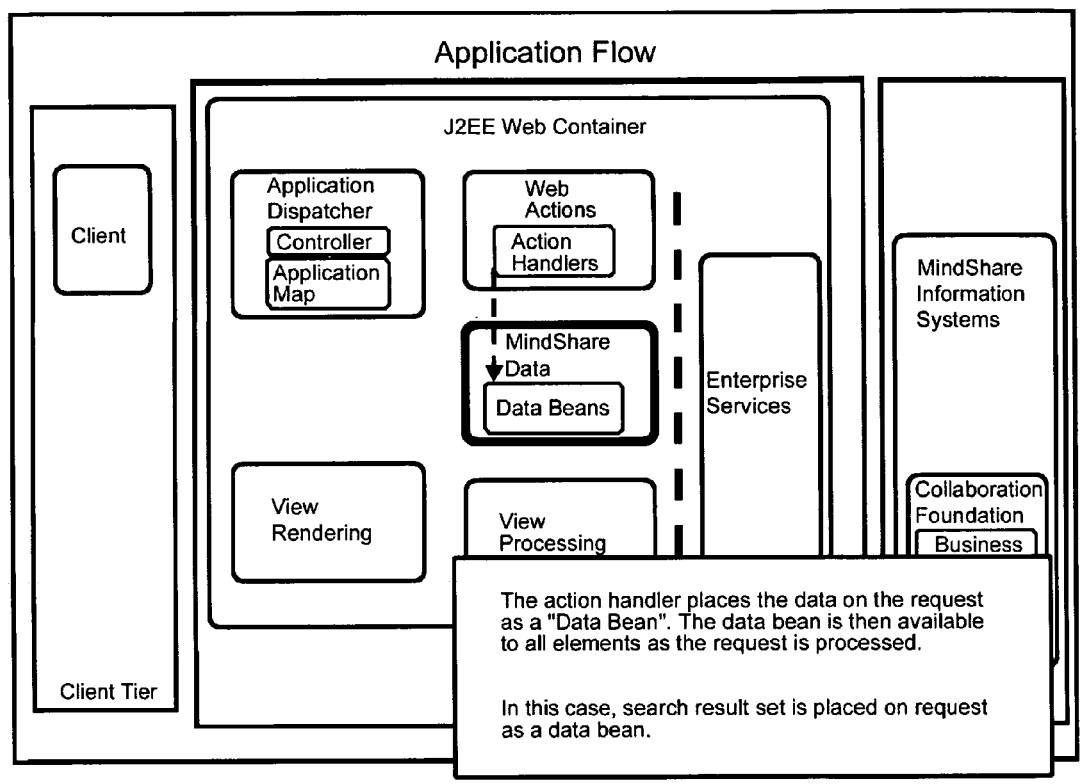
FIG. 13 is a diagram of a further portion of system flow or a manner of operation of the subject system of FIG. 7 in accordance with the principles of the subject invention.
Figure 14:
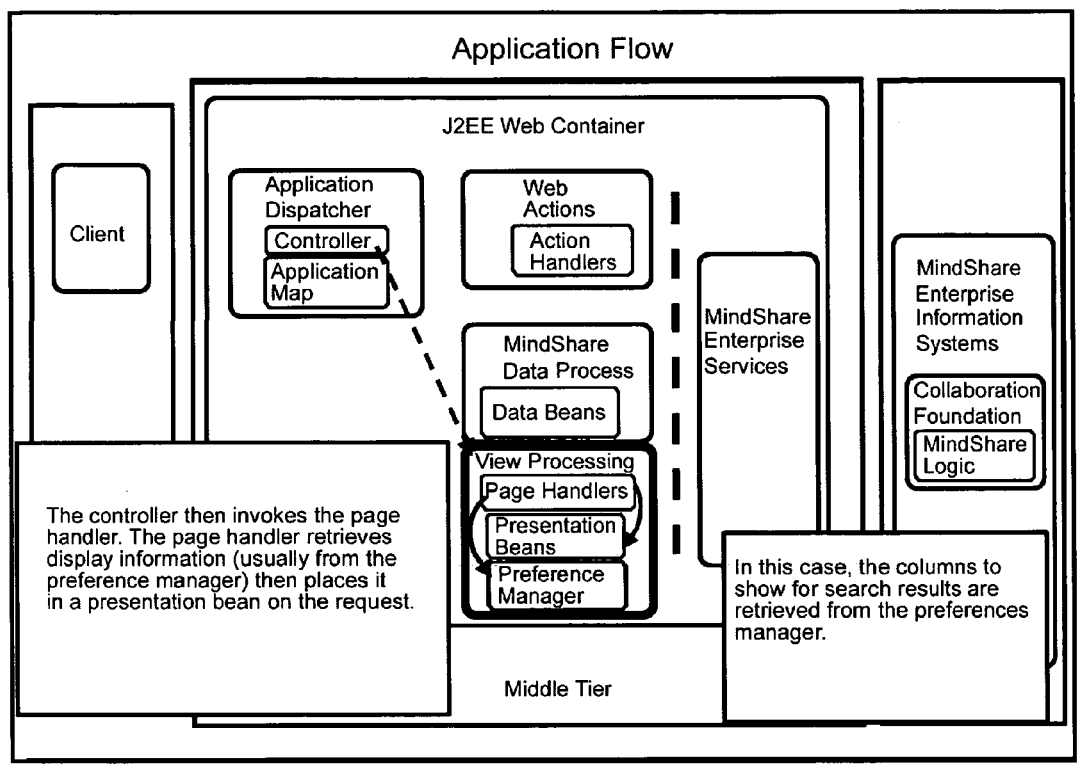
FIG. 14 is a diagram of a further portion of system flow or a manner of operation of the subject system of FIG. 7 in accordance with the principles of the subject invention.
Figure 15:
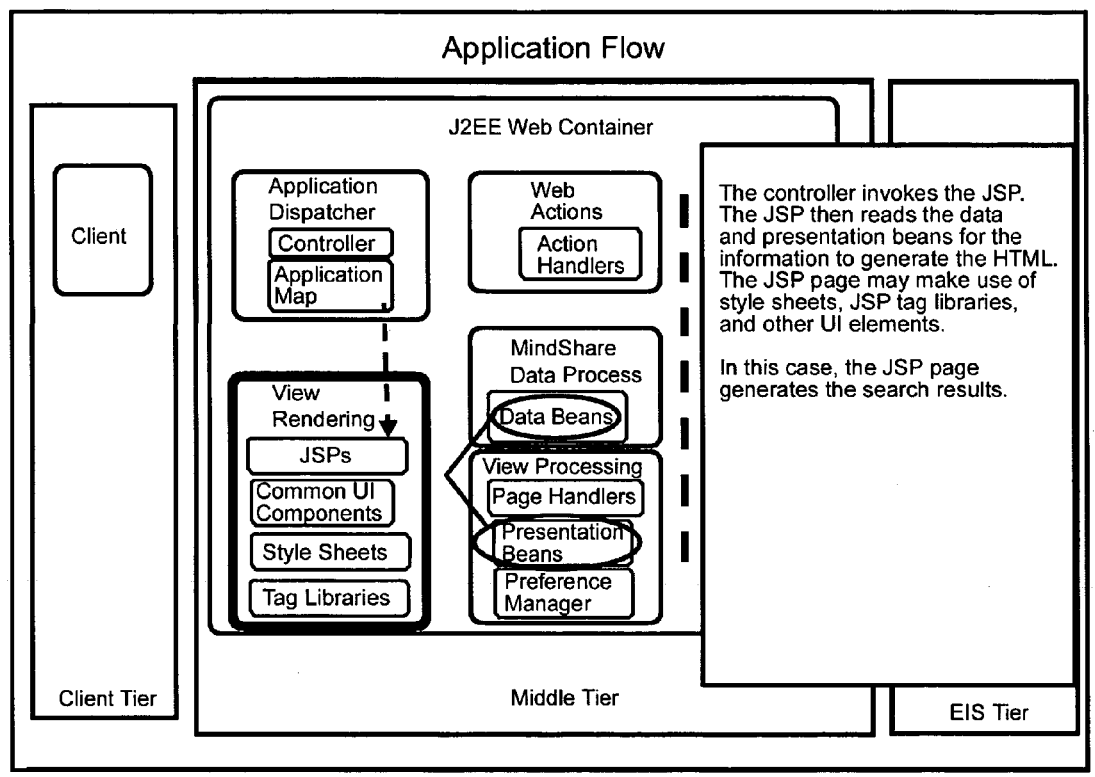
FIG. 15 is a diagram of a further portion of system flow or a manner of operation of the subject system of FIG. 7 in accordance with the principles of the subject invention.
Figure 16:
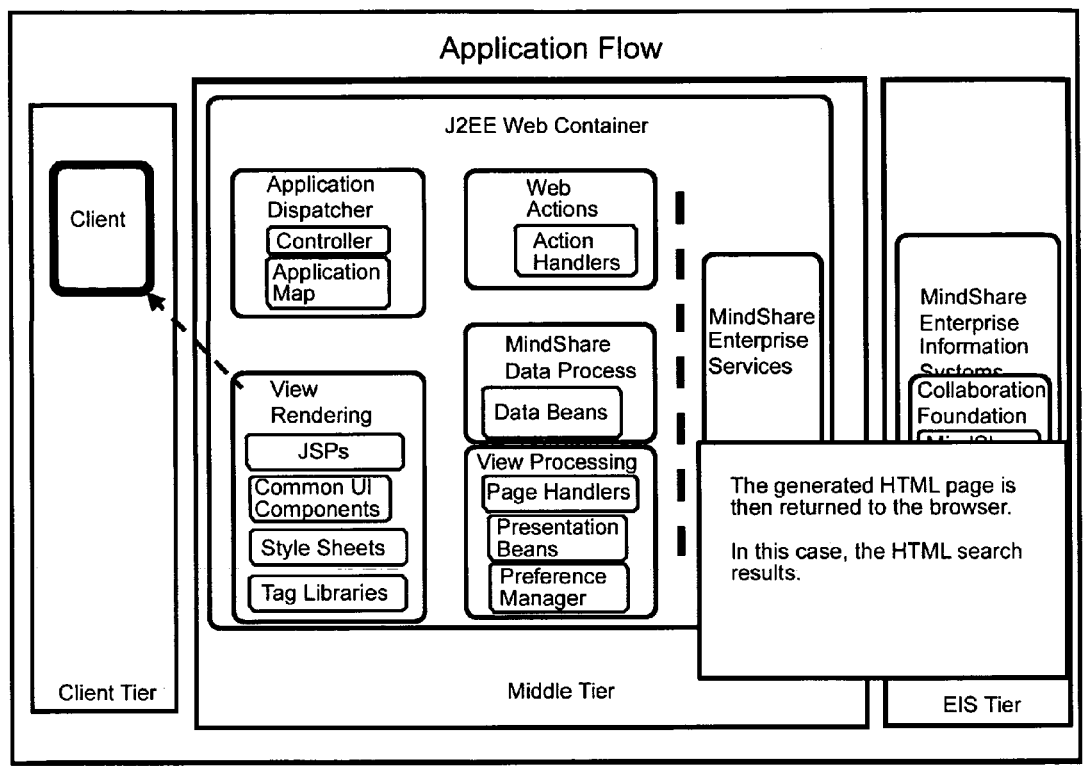
FIG. 16 is a diagram of a further portion of system flow or a manner of operation of the subject system of FIG. 7 in accordance with the principles of the subject invention.

In FIG. 13, the action handler places the data on the request as a "data bean." The data bean is then available to all elements as the request is processed. In the present case, the search result set (content) is placed on the request as a data bean. The controller then invokes the page handler as illustrated in FIG. 14. The page handler retrieves display information (usually from a preferences manager) then places the display information in a presentation bean on the request. In the present instance, the columns show the search results are retrieved from the preferences manager. In FIG. 15, the controller invokes the JSP. The JSP then reads the data and presentation beans for the information to generate the HTML (or other format as appropriate for the user). The JSP page may make use of style sheets, JSP tag libraries, and other UI elements. In this case, the JSP page generates the search results. Lastly, in FIG. 16, generated HTML page is then returned to the browser of the client (user). In the present case, the HTML page is the HTML search results.

Figure 17:
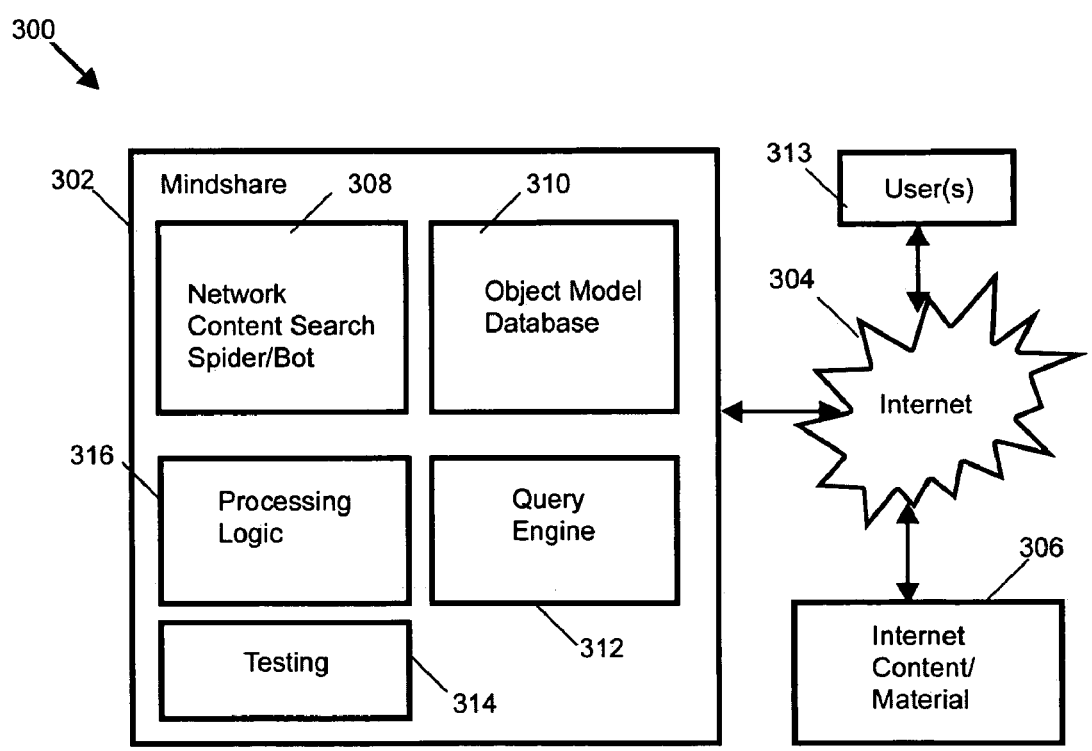
FIG. 17 is a block diagram of another exemplary system in accordance with the principles of the subject invention.

Referring now to FIG. 17, there is depicted another exemplary embodiment of a system, generally designated 300, that is functional to operate in the manner set forth herein with respect to the system 1 of FIG. 1 and/or with respect to that described below. Therefore, it should be appreciated that the system 300 may incorporate the functionality of the system 1 of FIG. 1 and, preferably, incorporates at least some if not all of the functionality of the system 1 of FIG. 1.

The system 300 includes a Mindshare system 302, a network such as the Internet 304 having Internet content and/or material 306, and a user or users 313. The Internet 304 in FIG. 17 is thus representative of any type of network, similar or not. The Internet content/material (collectively hereinafter, "content") 306 is thus representative of the many pages or sources of data or information associated with or on the Internet 304. The system 302 is in mutual communication with the Internet 304 and thus in mutual communication with the Internet content/material 306 and the users 313.

The system 302 includes among other features and/or functions not shown or described below, a network content search or scan spider, bot or the like 308, an object model database 310, processing logic 316, a query engine 312 and testing 314. Each block or module is representative of a feature, function, software and/or hardware implementation of the named block. Moreover, while not specifically shown, the various blocks of the system 302 work together as described herein.

The network content search bot 308 is operative, adapted and/or configured to search and/or scan the Internet 304 for content and/or material (hereinafter collectively, content). The content may be regarding any topic, subject or the like or may be a specific topic. The content may be different levels of a topic, subject or the like. The content search bot 308 may look only for specific content (i.e. content regarding a particular subject), a particular level of a specific topic, or any topic and/or level thereof. The content search bot 308 is operative to search or scan the Internet 304 "on the fly" (when specifically requested to find material regarding a particular topic of subject) or regularly to mine content. By example, the content search bot 308 looks at content stored on the Internet 304 and gathers data regarding the content. The content data is classified and tagged with metadata descriptors that correlate to palette criteria. The Internet Content Metadata (ICMD) is then processed by the object (processing) logic and/or stored as refined data by the object model database 310. The network content/search bot 308, either by itself or in conjunction with processing logic 316, gathers, assembles and/or compiles data regarding the content and/or attributes, characteristics and/or the like of the content. This ICMD (content data) is stored in the object model database 310.

The content 306 resides on or is a part of an Internet page, site, area, location or the like (i.e. one or more files on a computer, file server or the like, and collectively "Internet page"). The content 306 may be considered as and typically is the assemblage of data and/or information contained on an Internet page. Each Internet page contains one or more types of content. For example, Internet page "A" may contain text only. While Internet page A contains only one type of content, which is text, the form (e.g. letters) of the text itself has attributes or characteristics such as style, font and size. The text also has attributes such as subject matter, format, reading level and the like. Thus, each type of content has attributes that can be classified, catalogued and/or categorized. As a further example, Internet page "B" may contain pictures, text, graphics, active components and the like. Internet page B thus contains many forms of content each one of which has attributes and/or characteristics. It is these attributes, characteristics and/or the like that are utilized, at least in part, to create the ICMD Mindshare database (i.e. to create and/or store content data as object model data such as metadata).

The content search bot 308 reads the coding or code of a site in order to ascertain code or coding data such as metadata in the existing code of the site. When coding is XML, for example, tagging of items may be utilized. With XML, content may be coded or considered as metadata. This may be used directly by the system 300 or may be processed accordingly. XML sets forth the features, "what is what" and attributes regarding the content. The XML (as well as other coding but not necessarily to the same degree) may be directly used to provide content metadata (data) for the object model database 310. Of course, other coding or code may be read and analyzed, in addition to other particulars, characteristics, attributes of the content data.

The content search bot 308 updates its content data by revisiting Internet pages and, of course, continuing to search or scan the Internet for content. When a site is revisited, the system may compare new data with old data to determine whether the new data needs to be saved. Alternatively, new content data is saved automatically via it's associated ICMD. The object model database 310 also stores information regarding the location of the content data.

Particular content is provided to a user 313 by pushing the content to the user. In pushing the content to the user, the system 300 obtains the content via a connection path or channel to the particular site, then essentially passes the content to the user via another connection path or channel. The system 300 may process, filter, reformat or otherwise process the content before providing it to the user via a providing channel or connection, but preferably just passes through the content. The content has been correlated to the particular user utilizing the user's profile via the object model database (i.e. the structure, function and/or features of the data in the object model database 310, the processing logic 316 and the system 300 in general). Therefore, the system 300 provides the learning material (assembled content data) to the user 313.

The query engine 312 of the system 300 is operative, configured and/or adapted to allow a user and/or the system 302 to generate a query for "on the fly" content searching/scanning. This may be utilized for many reasons. The query engine also handles all requests by the system for data and/or information, in the context of providing content to a user, testing, and with regard to the system itself. In one form, the query engine may bring back real-time content whose content data has been processed and correlated appropriately as provided herein. Mindshare 302 may provide real-time data in the normal course of providing learning material rather than in response to a query. The real-time content may be provided in addition to or separate from other content.

The processing logic block 316 of the system 300 is representative of logic and/or circuitry that may be software, hardware, firmware or the like and/or any combination thereof, is operative, configured and/or adapted to process data in the manner described herein and/or provide the functionality and/or features of the system 300 as described herein.

The testing block 314 is representative of the ability of the system 302 to provide tests to a user in order to assess the progress of a user and the need to update a user's learning profile or palette. The tests may be automatically generated, be manually generated or be a combination thereof. Results of testing are used to modify a user's profile and/or modify the correlation between a user's profile and the content. Tests increase statistical correlation of information provided as compared to comprehension level.

The testing and user profile/correlation modification is preferably an evolutionary endless loop of subject and subject level presentation (until the user either accomplishes each level of each subject, topic or goal, or until the user quits the learning process). Testing may occur at any time or be scheduled at the end of various learning sections. Testing may be utilized to update a user's profile if necessary. Moreover, testing may be utilized to create and/or update a correlation object that functions to correlate the data in a user's learning profile with the content data.

Figure 18:
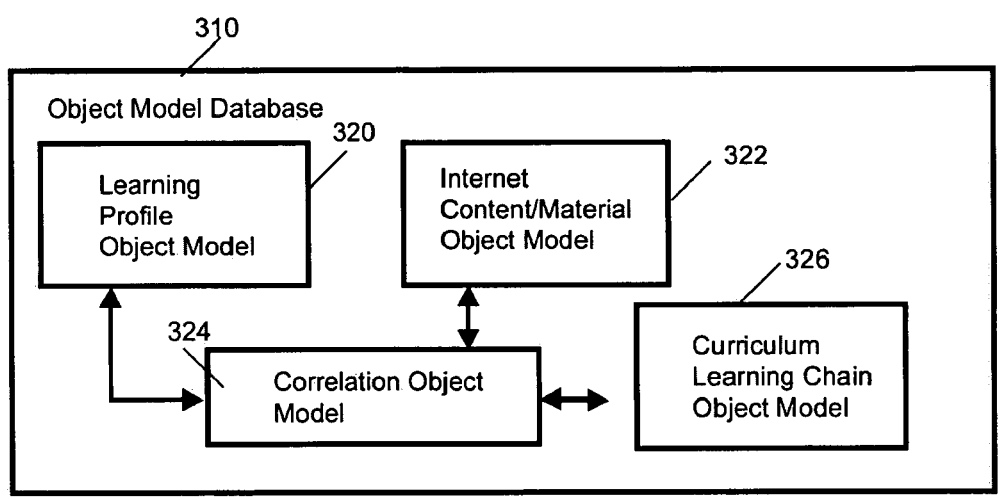
FIG. 18 is a block representation of the object model database of the exemplary system in accordance with the principles of the subject invention.

In FIG. 18, an exemplary model of the object model database 310 is shown. The object model database 310 may be considered as having or may be implemented as or in metadata. A metadata file for implementing an object model database 310 or the like is provided on the above-identified CD-R filed with the present application and which is incorporated herein by reference. The object model database 310 may be considered as having a learning profile object model module 320, an Internet content/material object model module 322, a correlation object model module 324 and a curriculum/learning chain object model module 326. The object model database 310 may, and preferably does, contain other modules not specifically shown for fulfilling the functionality provided herein.

The learning profile object model 320 stores from one to any number of learning profiles, typically one learning profile per user. The learning profile is obtained as provided herein and is stored as object model or metadata in the object model database 310. Particularly, the learning proclivities, preferences, attributes, characteristics and the like (e.g. grade level, reading level, color blindness, etc.) of the user are stored as learning profile data. In a basic sense, the learning profile data indicates how a user learns. The learning profile object model 320 is also preferably dynamic. The Internet content/material object model 322 stores the content data. The content data is preferably, but not necessarily, stored as metadata. The content object model is also preferably dynamic.

The correlation object model 324 provides correlation between the content object model 322 and the learning profile object model 320. The correlation object model 324 is definable by the system 302 and/or a manager of the system 302. As such, the correlation object model may be changed for various purposes. Various degrees and instances of correlation between a user profile and content is modifiable. In one form, the correlation object model 324 acts as a filter in order to match content to a user based on the user's profile. The user is thereby provided content that correlates in one or more manners in order to tailor the content to the user's abilities. Correlation may change during a curriculum, The curriculum/learning chain object model 326 is shown in FIG. 18 as separate from the other models. It should be appreciated that the curriculum/learning chain model 326 may be incorporated or resolved into one or more of the other models. The curriculum/learning chain object model 326 represents and implements the ability of the system 302 to provide a course of study with respect to myriad of subjects. As long as content exists, or is provided to the system 302 such as supplementary submission of content, the subject matter may be provided as a curriculum, course or object of study. The course of study may consist of many levels of understanding. Moreover, the curriculum/learning chain object model 326 provides learning chain establishment, monitoring, and assessment in order to assure command, mastery or even a basic understanding of the course of study at any particular level or point along the learning chain.

Figure 19:
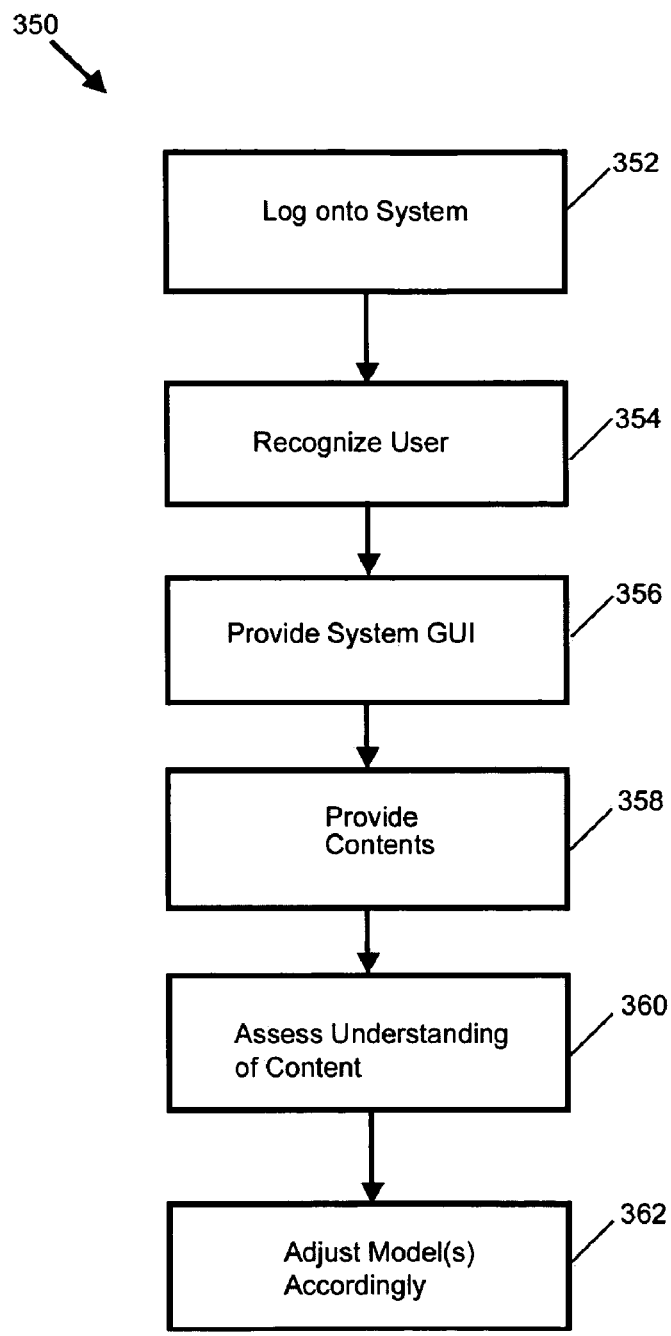
FIG. 19 is a flowchart of an exemplary manner of providing learning material in accordance with the principles of the subject invention.

Referring now to FIG. 19, there is illustrated a flow chart, generally designated 350, setting forth an exemplary manner of providing learning material in accordance with an aspect of the subject invention. It should, at the outset, be appreciated that the exemplary manner of providing learning material described below is a detailed manner of providing learning material. As such, a manner of providing learning material that is less detailed and derived from the detailed manner 350 may more than set forth the subject invention. In other words, a subset of steps of the manner 350 can implement the subject invention. Moreover, it should be appreciated that the manner 350 and any and all subsets thereof do not necessarily need to follow the order set forth herein.

In step 352, a user logs onto the system. As indicated above, the user utilizes the Internet or other network to establish communication with the system. Once the user has established communication with the system, in step 354, the system recognizes the user. Recognition of the user may take many forms and/or involve one or more interim steps. By way of example, once a user logs onto the system, the system needs to determine whether the user has a learning profile. If the user does have a learning profile, the learning profile (or learning profile data) is retrieved. If the user does not have a learning profile, the system establishes a learning profile through interaction with the user.

In step 356, the system provides a graphical user interface (GUI) or similar manner of providing information and allowing a user to interact and/or make selections or choices. The GUI may be as that presented above. In any case, the GUI provides the user with several selections or choices regarding many facets of the system, the user's account, and the providing of learning material the GUI may offer on the fly queries for subject matter in addition to providing a curriculum of subject matter. The user may access options via the GUI. Other features and/or functions may be provided by the GUI.

Assuming that the user selects to begin the learning mode, in step 358 the system provides learning content to the user. The system correlates content with the user's profile and pushes the content to the user. Particularly, the system correlates the learning proclivities and/or preferences with content of the particular subject matter and correlated to the learning proclivities and/or preferences.

In step 360, the system assesses the degree of user understanding of the content. This may be done by testing or other means. The assessment may be provided at various levels along the learning chain for the particular content or subject matter. The assessment outcome is utilized to modify the user's learning profile and/or the user's correlation model and, in step 362, the learning profile, correlation model and/or other data/information is adjusted or modified accordingly. Subsequent content is provided according to the modified learning profile and/or correlation model. This process may be an endless loop of subject and subject level presentation or up to a particular level or goal.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the claims hereafter.

What is claimed is:

1. A method of providing learning material comprising the steps of:
    establishing a learning profile for a user, the learning profile storing user learning proclivities;
    locating potential learning material from material gleaned from an Internet site;
    obtaining data from the Internet site regarding content characteristics of the located potential learning material;
    identifying learning material for the user by correlating the obtained data from the Internet site regarding the content characteristics of the located potential learning material with the learning proclivities of the learning profile of the user; and
    providing the identified learning material to the user.

2. The method of claim 1, wherein the step of locating potential learning material from material gleaned from an Internet site includes the step of utilizing a bot to search the Internet.

3. The method of claim 1, wherein the step of obtaining data from the Internet site regarding content characteristics of the located potential learning material includes the step of storing the obtained data regarding content characteristics of the located potential learning material in a relational and object model database.

4. The method of claim 3, wherein the step of storing the obtained data regarding content characteristics of the located potential learning material in a relational and object model database includes storing the obtained data in an object model database as metadata.

5. The method of claim 1, wherein establishing a learning profile for a user includes establishing a learning profile as metadata.

6. The method of claim 5, wherein the step of identifying learning material for the user by correlating the obtained data from the Internet site regarding the content characteristics of located potential learning material with the learning proclivities of the learning profile of the user includes utilizing a new correlation object model that can be continuously updated to match tested effective correctness of the correlated material.

7. The method of claim 1, further comprising the step of:
    assessing understanding of the provided identified learning material to the user.

8. The method of claim 7, wherein assessing understanding of the provided identified learning material to the user includes providing a test to the user regarding the provided identified learning material.

9. The method of claim 8, further comprising the step of:
modifying the learning profile of the user in accordance with results of the provided test.

10. A system for providing learning material to a user via the Internet comprising:
means for scanning Internet sites for potential learning material;
means for obtaining data regarding content attributes of the scanned potential learning material from the Internet site having the scanned potential learning material;
means for storing the obtained data regarding content attributes of the scanned potential learning material;
means for correlating the stored obtained data regarding content attributes of the scanned potential learning material with learning proclivities of a learning profile of a user; and
means for providing selective learning material from the scanned potential learning material based on correlation factors between the obtained data regarding content attributes of the potential learning material and the learning proclivities of the learning profile of the user.

11. The system of claim 10, wherein the means for storing the obtained data regarding content attributes of the scanned potential learning material comprises an object model system.

12. The system of claim 11, wherein the object model system acts upon a metadata database.

13. The system of claim 10, wherein the means for correlating the stored obtained data regarding content attributes of the scanned potential learning material with learning proclivities of a learning profile of a user comprises a correlation object.

14. A method of providing learning material for dissemination to a student, comprising the steps of:
scanning a network having a plurality of data sites, each data site having content;
determining attributes of the scanned content from its data site;
storing data regarding the determined attributes of the scanned content;
identifying learning material for the user from the scanned content by correlating the stored data regarding the attributes of the scanned content with learning proclivities of a user stored in a learning profile of the user; and
providing the identified learning material to the user.

15. The method of claim 14, wherein the step of storing data regarding the determined attributes of the scanned content includes the step of storing data regarding determined attributes of the scanned content into a relational and object model database.

16. The method of claim 15, wherein storing data regarding determined attributes of the scanned content into an object model database includes storing the attributes data in a relational and object model database as metadata.

17. The method of claim 14, wherein identifying learning material for the user from the scanned Internet content by correlating the stored data regarding the attributes of the scanned content with learning proclivities of a user stored in a learning profile of the user includes utilizing a correlation object.

18. The method of claim 14, further comprising the step of:
assessing understanding of the provided identified learning material to the user.

19. The method of claim 18, wherein assessing understanding of the provided identified learning material to the user includes providing testing to the user regarding the provided learning material.

20. The method of claim 19, further comprising the step of:
modifying the learning profile of the user based on testing results.

21. The method of claim 14, further comprising the steps of:
maintaining user preferences, established by the user and coupled with the learning profile data;
recording and maintaining a reference for extending Internet data recovery and user display of a previous interaction with Internet subject matter;
utilizing the reference data and maintained user preferences to provide the user with information that takes into account their previous Internet sessions to extend appropriately the learning process;
maintaining a position in a learning curriculum for the user;
providing automatically, a next logical segment in the learning program for the learning curriculum from information located on the Internet; and
maintaining individual records of all pertinent data for access through security measures.

* * * * *